United States Patent
Chen et al.

(10) Patent No.: US 12,382,088 B2
(45) Date of Patent: Aug. 5, 2025

(54) MOTION ESTIMATION REGION FOR THE MERGE CANDIDATES

(71) Applicant: BEIJING DAJIA INTERNET INFORMATION TECHNOLOGY CO., LTD., Beijing (CN)

(72) Inventors: Yi-Wen Chen, Beijing (CN); Xiaoyu Xiu, Beijing (CN); Tsung-Chuan Ma, Beijing (CN); Hong-Jheng Jhu, Beijing (CN); Xianglin Wang, Beijing (CN); Bing Yu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 221 days.

(21) Appl. No.: 17/847,023

(22) Filed: Jun. 22, 2022

(65) Prior Publication Data

US 2022/0329846 A1 Oct. 13, 2022

Related U.S. Application Data

(63) Continuation of application No. PCT/US2020/066815, filed on Dec. 23, 2020.
(Continued)

(51) Int. Cl.
*H04N 19/139* (2014.01)
*H04N 19/105* (2014.01)
(Continued)

(52) U.S. Cl.
CPC ........... *H04N 19/52* (2014.11); *H04N 19/105* (2014.11); *H04N 19/159* (2014.11); *H04N 19/70* (2014.11)

(58) Field of Classification Search
CPC .... H04N 19/52; H04N 19/105; H04N 19/159; H04N 19/70; H04N 19/96; H04N 19/513;
(Continued)

(56) References Cited

U.S. PATENT DOCUMENTS 10,230,980 B2 * 3/2019 Liu ...................... H04N 19/583
10,321,145 B2 * 6/2019 Lee ...................... H04N 19/463
(Continued)

FOREIGN PATENT DOCUMENTS

KR 20170056594 A 5/2017
KR 20170108012 A 9/2017
(Continued)

OTHER PUBLICATIONS

Beijing Dajia Internet Information Technology Co., Ltd., International Search Report and Written Opinion, PCT/US2020/066815, Apr. 9, 2021, 10 pgs.
(Continued)

*Primary Examiner* — Philip P. Dang
(74) *Attorney, Agent, or Firm* — SCULLY, SCOTT, MURPHY & PRESSER, P.C.

(57) ABSTRACT

An electronic apparatus performs a method of encoding and decoding video data. The method comprises: receiving, from a bitstream, the video data corresponding to a coding unit; receiving, from the video data, a first syntax element that defines a Motion Estimation Region (MER); receiving a plurality of second syntax elements from the video data, wherein the plurality of second syntax elements indicate whether the coding unit is in a subblock-based temporal motion vector prediction (SbTMVP) mode; in accordance with a determination that the coding unit is in the SbTMVP mode, determining whether both a spatial neighboring block used to determine a temporal vector of the coding unit and the coding unit are within the same MER; and in accordance
(Continued)

with a determination that both the spatial neighboring block and the coding unit are within the same MER, setting the temporal vector of the coding unit to zero.

12 Claims, 19 Drawing Sheets

Related U.S. Application Data

(60) Provisional application No. 62/953,421, filed on Dec. 24, 2019.

(51) Int. Cl.
  H04N 19/159 (2014.01)
  H04N 19/176 (2014.01)
  H04N 19/52 (2014.01)
  H04N 19/70 (2014.01)

(58) Field of Classification Search
  CPC ... H04N 19/109; H04N 19/176; H04N 19/184
  See application file for complete search history.

(56) References Cited

U.S. PATENT DOCUMENTS

| | | | | |
|---|---|---|---|---|
| 11,240,524 | B2* | 2/2022 | Chen | H04N 19/184 |
| 11,477,477 | B2* | 10/2022 | Chen | H04N 19/52 |
| 11,539,958 | B2* | 12/2022 | Jang | H04N 19/137 |
| 11,570,443 | B2* | 1/2023 | Ko | H04N 19/82 |
| 11,876,957 | B2* | 1/2024 | Jang | H04N 19/577 |
| 2016/0219278 | A1 | 7/2016 | Chen et al. | |
| 2018/0310017 | A1* | 10/2018 | Chen | H04N 19/52 |
| 2019/0387247 | A1 | 12/2019 | Huang et al. | |
| 2020/0221077 | A1* | 7/2020 | Park | H04N 19/513 |

FOREIGN PATENT DOCUMENTS

| | | |
|---|---|---|
| WO | WO2018099269 A1 | 6/2018 |
| WO | 2019147079 A1 | 8/2019 |
| WO | 2019199141 A1 | 10/2019 |
| WO | WO2021104474 A1 | 6/2021 |

OTHER PUBLICATIONS

Jianle Chen et al., "Algorithm description for Versatile Video Coding and Test Model 7 (VTM 7)", 16. JVET Meeting; Oct. 1, 2019-Oct. 11, 2019; Geneva; (The Joint Video Exploration Team of ISO/IEC JTC1/SC29/WG11 and ITU-T SG.16), No. JVET-P2002-v1; JVET-P2002; m51516 Nov. 10, 2019 (Nov. 10, 2019), pp. 1-90, XP030224331, [retrieved on Nov. 10, 2019], Retrieved from the Internet: http://phenix.int-evry.fr/jvet/doc_end_user/documents/16_Geneva/wg11/JVET-P2002-v1.

Esenlik (Huawei) S et al: "Non-CE4: Parallel Merge Estimation for VVC", 12. JVET Meeting; Oct. 3, 2018-Oct. 12, 2018; Macao; (The Joint Video Exploration Team of ISO/IEC JTC1/SC29/WG11 and ITU-TSG.16), No. JVET-L0216 Oct. 5, 2018 (Oct. 5, 2018), XP030251166, [retrieved on Oct. 5, 2018], Retrieved from the Internet: http://phenix.int-evry.fr/jvet/doc_end_user/documents/12_Macao/wg11/JVET-L0216-v2.

Beijing Dajia Internet Information Technology Co., Ltd., Supplementary European search report of European patent application 20907248.7 issued from EPO dated Apr. 13, 2023.

Beijing Dajia Internet Information Technology Co., Ltd., First examination report of European patent application 20907248.7 issued from EPO dated Apr. 25, 2023.

Bross, B. et al., "Versatile Video Coding (Draft 3)", Joint Video Experts Team (JVET) of ITU-T SG 16WP 3 and ISO/IEC JTC 1/SC 29/WG 11, 2018, pp. 1-23.

Office Action dated Jan. 22, 2025 received in Chinese patent Application No. 202211167139.6.

* cited by examiner

MOTION ESTIMATION REGION FOR THE MERGE CANDIDATES

CROSS-REFERENCE TO RELATED APPLICATIONS

The present application is a continuation of PCT Application No. PCT/US2020/066815, entitled "MOTION ESTIMATION REGION FOR THE MERGE CANDIDATES" filed Dec. 23, 2020, which claims priority to U.S. Provisional Patent Application No. 62/953,421, entitled "Motion Estimation Region for the Merge Candidates" filed Dec. 24, 2019, all of which are incorporated by reference in their entirety.

TECHNICAL FIELD

The present application generally relates to video coding and compression, and more specifically, to methods and apparatus on improving construction of a merge candidate list.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit, receive, encode, decode, and/or store digital video data by implementing video compression/decompression standards as defined by MPEG-4, ITU-T H.263, ITU-T H.264/MPEG-4, Part 10, Advanced Video Coding (AVC), High Efficiency Video Coding (HEVC), and Versatile Video Coding (VVC) standard. Video compression typically includes performing spatial (intra frame) prediction and/or temporal (inter frame) prediction to reduce or remove redundancy inherent in the video data. For block-based video coding, a video frame is partitioned into one or more slices, each slice having multiple video blocks, which may also be referred to as coding tree units (CTUs). Each CTU may contain one coding unit (CU) or recursively split into smaller CUs until the predefined minimum CU size is reached. Each CU (also named leaf CU) contains one or multiple transform units (TUs) and each CU also contains one or multiple prediction units (PUs). Each CU can be coded in either intra, inter or IBC modes. Video blocks in an intra coded (I) slice of a video frame are encoded using spatial prediction with respect to reference samples in neighboring blocks within the same video frame. Video blocks in an inter coded (P or B) slice of a video frame may use spatial prediction with respect to reference samples in neighboring blocks within the same video frame or temporal prediction with respect to reference samples in other previous and/or future reference video frames.

Spatial or temporal prediction based on a reference block that has been previously encoded, e.g., a neighboring block, results in a predictive block for a current video block to be coded. The process of finding the reference block may be accomplished by block matching algorithm. Residual data representing pixel differences between the current block to be coded and the predictive block is referred to as a residual block or prediction errors. An inter-coded block is encoded according to a motion vector that points to a reference block in a reference frame forming the predictive block, and the residual block. The process of determining the motion vector is typically referred to as motion estimation. An intra coded block is encoded according to an intra prediction mode and the residual block. For further compression, the residual block is transformed from the pixel domain to a transform domain, e.g., frequency domain, resulting in residual transform coefficients, which may then be quantized. The quantized transform coefficients, initially arranged in a two-dimensional array, may be scanned to produce a one-dimensional vector of transform coefficients, and then entropy encoded into a video bitstream to achieve even more compression.

The encoded video bitstream is then saved in a computer-readable storage medium (e.g., flash memory) to be accessed by another electronic device with digital video capability or directly transmitted to the electronic device wired or wirelessly. The electronic device then performs video decompression (which is an opposite process to the video compression described above) by, e.g., parsing the encoded video bitstream to obtain syntax elements from the bitstream and reconstructing the digital video data to its original format from the encoded video bitstream based at least in part on the syntax elements obtained from the bitstream, and renders the reconstructed digital video data on a display of the electronic device.

With digital video quality going from high definition, to 4K×2K or even 8K×4K, the amount of vide data to be encoded/decoded grows exponentially. It is a constant challenge in terms of how the video data can be encoded/decoded more efficiently while maintaining the image quality of the decoded video data.

SUMMARY

The present application describes implementations related to video data encoding and decoding and, more particularly, to methods and apparatus on construction of a merge candidate list.

According to a first aspect of the present application, a method of decoding video data includes receiving, from a bitstream, the video data corresponding to a coding unit; receiving, from the video data, a first syntax element that defines a Motion Estimation Region (MER); receiving a plurality of second syntax elements from the video data, wherein the plurality of second syntax elements indicate whether the coding unit is in a subblock-based temporal motion vector prediction (SbTMVP) mode; in accordance with a determination that the coding unit is in the SbTMVP mode, determining whether both a spatial neighboring block used to determine a temporal vector of the coding unit and the coding unit are within the same MER; and in accordance with a determination that both the spatial neighboring block and the coding unit are within the same MER, setting the temporal vector of the coding unit to zero.

According to a second aspect of the present application, a method of decoding video data includes receiving, from a bitstream, the video data corresponding to a coding unit; receiving, from the video data, a first syntax element that defines a Motion Estimation Region (MER); receiving a plurality of second syntax elements from the video data, wherein the plurality of second syntax elements indicate whether the coding unit is in a subblock-based temporal motion vector prediction (SbTMVP) mode; in accordance with a determination that the coding unit is in the SbTMVP mode, determining whether both a first spatial neighboring block used to determine a temporal vector of the coding unit and the coding unit are within the same MER; and in accordance with a determination that both the first spatial neighboring block and the coding unit are within the same MER, selecting a second spatial neighboring block that is outside of the MER as a replacement to the first spatial neighboring block to determine the temporal vector of the coding unit.

According to a third aspect of the present application, a method of decoding video data includes receiving, from a bitstream, the video data corresponding to a coding unit; receiving, from the video data, a first syntax element that defines a Motion Estimation Region (MER); receiving a plurality of second syntax elements from the video data, wherein the plurality of second syntax elements indicate whether the coding unit is in a merge mode; in accordance with a determination that the coding unit is in the merge mode, receiving a plurality of merge candidates for the coding unit; determining whether both a first spatial neighboring block used to determine a first merge candidate from the plurality of merge candidates and the coding unit are within the same MER; and in accordance with a determination that both the first spatial neighboring block and the coding unit are within the same MER, selecting a second merge candidate from the plurality of merge candidates as a replacement to the first merge candidate.

According to a fourth aspect of the present application, a method of decoding video data includes receiving, from a bitstream, the video data corresponding to a coding unit; receiving, from the video data, a first syntax element that defines a Motion Estimation Region (MER); receiving a plurality of second syntax elements from the video data, wherein the plurality of second syntax elements indicate whether the coding unit is in a merge mode; in accordance with a determination that the coding unit is in the merge mode, determining whether both a first spatial neighboring block used to determine a merge candidate and the coding unit are within the same MER; and in accordance with a determination that both the first spatial neighboring block and the coding unit are within the same MER, selecting a second spatial neighboring block that is outside of the MER as a replacement to the first spatial neighboring block as the merge candidate.

In some embodiments, the merge mode is Intra block copy (IBC) Merge.

In some embodiments, the merge mode is Combined inter and intra prediction (CIIP) Merge.

According to a fifth aspect of the present application, an electronic apparatus includes one or more processing units, memory and a plurality of programs stored in the memory. The programs, when executed by the one or more processing units, cause the electronic apparatus to perform the method of decoding video data as described above.

According to a sixth aspect of the present application, a non-transitory computer readable storage medium stores a plurality of programs for execution by an electronic apparatus having one or more processing units. The programs, when executed by the one or more processing units, cause the electronic apparatus to perform the method of decoding video data as described above.

BRIEF DESCRIPTION OF DRAWINGS

The accompanying drawings, which are included to provide a further understanding of the implementations and are incorporated herein and constitute a part of the specification, illustrate the described implementations and together with the description serve to explain the underlying principles. Like reference numerals refer to corresponding parts.

DETAILED DESCRIPTION

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic devices with digital video capabilities.

In some embodiments, several modifications to the newly derived coding tools are introduced to support parallel motion estimation or more parallel-friendly design for the parallel motion estimation of the blocks located within the same parallel motion estimation region (PMER). The size of the PMER can be pre-determined implicitly at different levels for both encoder and decoder. For example, the size of the PMER can be fixed as a predefined size (e.g., 32×32, 64×64) or the PMER can be set to the coding tree unit (CTU) size or maximum transform unit (TU) size or virtual pipeline data unit (VPDU) size. Or, additional syntax elements can be signaled at different levels (e.g. sequence level, picture level, slice level, tile level, CTU level and/or block level) to indicate the size (e.g. width and height) of the PMER. Additional syntax elements can also be signaled at different levels (e.g. sequence level, picture level, slice level, tile level, CTU level and/or block level) to indicate whether the scheme is enabled or not.

Figure 1:
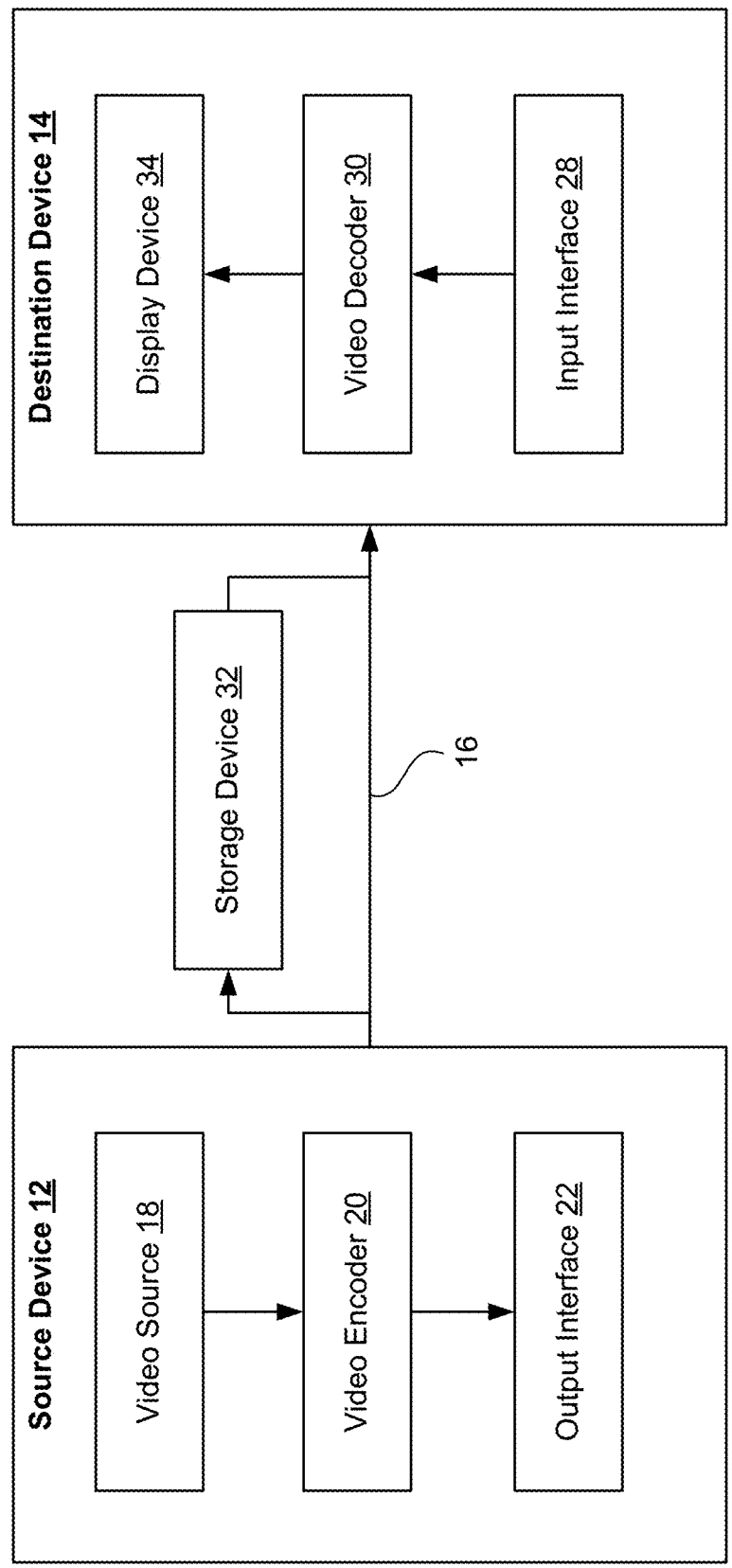
FIG. 1 is a block diagram illustrating an exemplary video encoding and decoding system in accordance with some implementations of the present disclosure.

FIG. 1 is a block diagram illustrating an exemplary system 10 for encoding and decoding video blocks in parallel in accordance with some implementations of the present disclosure. As shown in FIG. 1, system 10 includes a source device 12 that generates and encodes video data to be decoded at a later time by a destination device 14. Source device 12 and destination device 14 may comprise any of a wide variety of electronic devices, including desktop or laptop computers, tablet computers, smart phones, set-top boxes, digital televisions, cameras, display devices, digital media players, video gaming consoles, video streaming device, or the like. In some implementations, source device 12 and destination device 14 are equipped with wireless communication capabilities.

In some implementations, destination device 14 may receive the encoded video data to be decoded via a link 16. Link 16 may comprise any type of communication medium or device capable of moving the encoded video data from source device 12 to destination device 14. In one example, link 16 may comprise a communication medium to enable source device 12 to transmit the encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some other implementations, the encoded video data may be transmitted from output interface 22 to a storage device 32. Subsequently, the encoded video data in storage device 32 may be accessed by destination device 14 via input interface 28. Storage device 32 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 32 may correspond to a file server or another intermediate storage device that may hold the encoded video data generated by source device 12. Destination device 14 may access the stored video data from storage device 32 via streaming or downloading. The file server may be any type of computer capable of storing encoded video data and transmitting the encoded video data to destination device 14. Exemplary file servers include a web server (e.g., for a website), an FTP server, network attached storage (NAS) devices, or a local disk drive. Destination device 14 may access the encoded video data through any standard data connection, including a wireless channel (e.g., a Wi-Fi connection), a wired connection (e.g., DSL, cable modem, etc.), or a combination of both that is suitable for accessing encoded video data stored on a file server. The transmission of encoded video data from storage device 32 may be a streaming transmission, a download transmission, or a combination of both.

As shown in FIG. 1, source device 12 includes a video source 18, a video encoder 20 and an output interface 22. Video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera of a security surveillance system, source device 12 and destination device 14 may form camera phones or video phones. However, the implementations described in the present application may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 32 for later access by destination device 14 or other devices, for decoding and/or playback. Output interface 22 may further include a modem and/or a transmitter.

Destination device 14 includes an input interface 28, a video decoder 30, and a display device 34. Input interface 28 may include a receiver and/or a modem and receive the encoded video data over link 16. The encoded video data communicated over link 16, or provided on storage device 32, may include a variety of syntax elements generated by video encoder 20 for use by video decoder 30 in decoding the video data. Such syntax elements may be included within the encoded video data transmitted on a communication medium, stored on a storage medium, or stored a file server.

In some implementations, destination device 14 may include a display device 34, which can be an integrated display device and an external display device that is configured to communicate with destination device 14. Display device 34 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to proprietary or industry standards, such as VVC, HEVC, MPEG-4, Part 10, Advanced Video Coding (AVC), or extensions of such standards. It should be understood that the present application is not limited to a specific video coding/decoding standard and may be applicable to other video coding/decoding standards. It is generally contemplated that video encoder 20 of source device 12 may be configured to encode video data according to any of these current or future standards. Similarly, it is also generally contemplated that video decoder 30 of destination device 14 may be configured to decode video data according to any of these current or future standards.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When implemented partially in software, an electronic device may store instructions for the software in a suitable, non-transitory computer-readable medium and execute the instructions in hardware using one or more processors to perform the video coding/decoding operations disclosed in the present disclosure. Each of video encoder 20 and video decoder 30 may be included in one or more encoders or decoders, either of which may be integrated as part of a combined encoder/decoder (CODEC) in a respective device.

Figure 2:
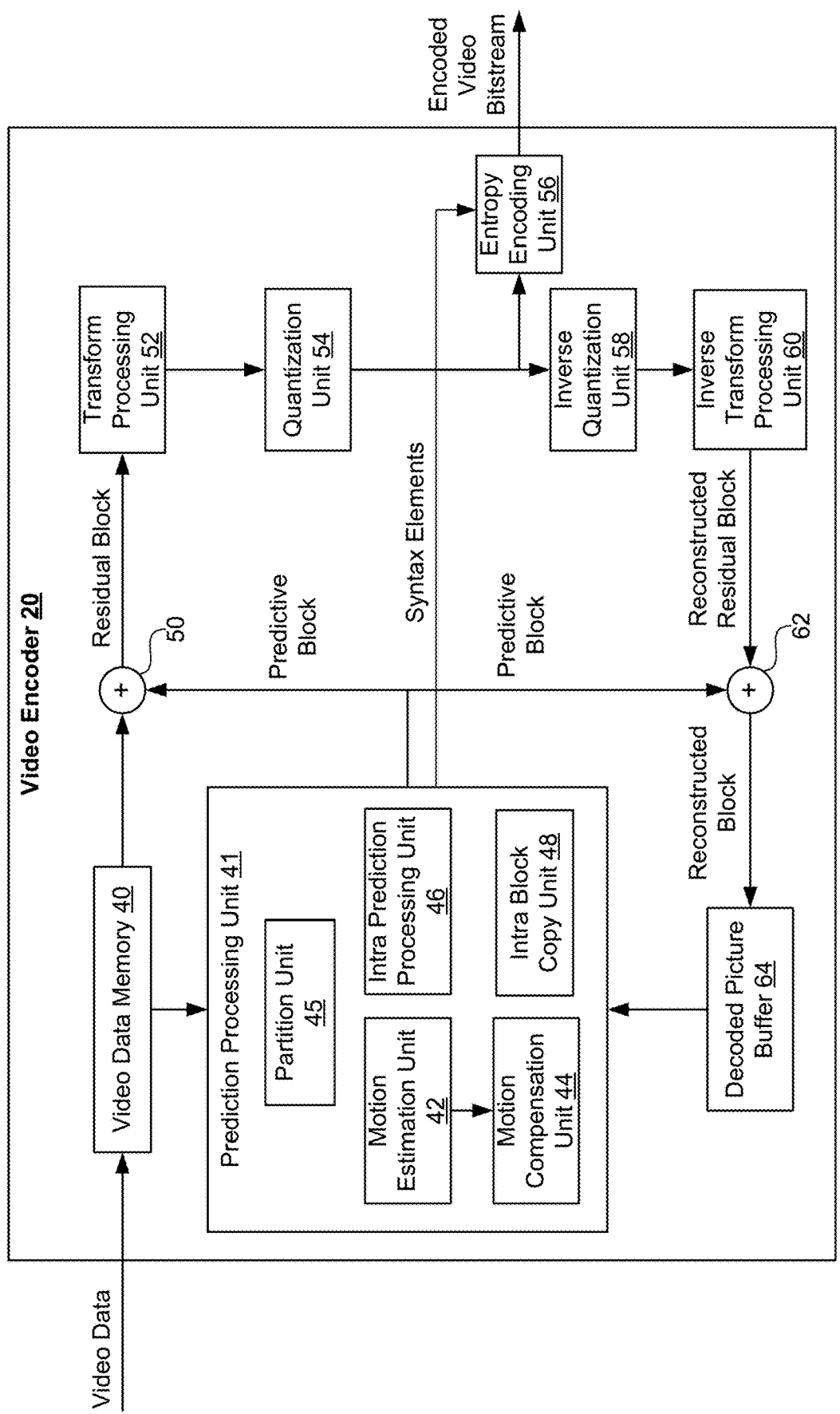
FIG. 2 is a block diagram illustrating an exemplary video encoder in accordance with some implementations of the present disclosure.

FIG. 2 is a block diagram illustrating an exemplary video encoder 20 in accordance with some implementations described in the present application. Video encoder 20 may perform intra and inter predictive coding of video blocks within video frames. Intra predictive coding relies on spatial prediction to reduce or remove spatial redundancy in video data within a given video frame or picture. Inter predictive coding relies on temporal prediction to reduce or remove temporal redundancy in video data within adjacent video frames or pictures of a video sequence.

As shown in FIG. 2, video encoder 20 includes video data memory 40, prediction processing unit 41, decoded picture buffer (DPB) 64, summer 50, transform processing unit 52, quantization unit 54, and entropy encoding unit 56. Prediction processing unit 41 further includes motion estimation unit 42, motion compensation unit 44, partition unit 45, intra prediction processing unit 46, and intra block copy (BC) unit 48. In some implementations, video encoder 20 also includes inverse quantization unit 58, inverse transform processing unit 60, and summer 62 for video block reconstruction. A deblocking filter (not shown) may be positioned between summer 62 and DPB 64 to filter block boundaries to remove blockiness artifacts from reconstructed video. An in loop filter (not shown) may also be used in addition to the deblocking filter to filter the output of summer 62. Video encoder 20 may take the form of a fixed or programmable hardware unit or may be divided among one or more of the illustrated fixed or programmable hardware units.

Video data memory 40 may store video data to be encoded by the components of video encoder 20. The video data in video data memory 40 may be obtained, for example, from video source 18. DPB 64 is a buffer that stores reference video data for use in encoding video data by video encoder 20 (e.g., in intra or inter predictive coding modes). Video data memory 40 and DPB 64 may be formed by any of a variety of memory devices. In various examples, video data memory 40 may be on-chip with other components of video encoder 20, or off-chip relative to those components.

As shown in FIG. 2, after receiving video data, partition unit 45 within prediction processing unit 41 partitions the video data into video blocks. This partitioning may also include partitioning a video frame into slices, tiles, or other larger coding units (CUs) according to a predefined splitting structures such as quad-tree structure associated with the video data. The video frame may be divided into multiple video blocks (or sets of video blocks referred to as tiles). Prediction processing unit 41 may select one of a plurality of possible predictive coding modes, such as one of a plurality of intra predictive coding modes or one of a plurality of inter predictive coding modes, for the current video block based on error results (e.g., coding rate and the level of distortion). Prediction processing unit 41 may provide the resulting intra or inter prediction coded block to summer 50 to generate a residual block and to summer 62 to reconstruct the encoded block for use as part of a reference frame subsequently. Prediction processing unit 41 also provides syntax elements, such as motion vectors, intra-mode indicators, partition information, and other such syntax information, to entropy encoding unit 56.

In order to select an appropriate intra predictive coding mode for the current video block, intra prediction processing unit 46 within prediction processing unit 41 may perform intra predictive coding of the current video block relative to one or more neighboring blocks in the same frame as the current block to be coded to provide spatial prediction. Motion estimation unit 42 and motion compensation unit 44 within prediction processing unit 41 perform inter predictive coding of the current video block relative to one or more predictive blocks in one or more reference frames to provide temporal prediction. Video encoder 20 may perform multiple coding passes, e.g., to select an appropriate coding mode for each block of video data.

In some implementations, motion estimation unit 42 determines the inter prediction mode for a current video frame by generating a motion vector, which indicates the displacement of a prediction unit (PU) of a video block within the current video frame relative to a predictive block within a reference video frame, according to a predetermined pattern within a sequence of video frames. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). The predetermined pattern may designate video frames in the sequence as P frames or B frames. Intra BC unit 48 may determine vectors, e.g., block vectors, for intra BC coding in a manner similar to the determination of motion vectors by motion estimation unit 42 for inter prediction, or may utilize motion estimation unit 42 to determine the block vector.

A predictive block is a block of a reference frame that is deemed as closely matching the PU of the video block to be coded in terms of pixel difference, which may be determined by sum of absolute difference (SAD), sum of square difference (SSD), or other difference metrics. In some implementations, video encoder 20 may calculate values for sub-integer pixel positions of reference frames stored in DPB 64. For example, video encoder 20 may interpolate values of one-quarter pixel positions, one-eighth pixel positions, or other fractional pixel positions of the reference frame. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter prediction coded frame by comparing the position of the PU to the position of a predictive block of a reference frame selected from a first reference frame list (List 0) or a second reference frame list (List 1), each of which identifies one or more reference frames stored in DPB 64. Motion estimation unit 42 sends the calculated motion vector to motion compensation unit 44 and then to entropy encoding unit 56.

Motion compensation, performed by motion compensation unit 44, may involve fetching or generating the predictive block based on the motion vector determined by motion estimation unit 42. Upon receiving the motion vector for the PU of the current video block, motion compensation unit 44 may locate a predictive block to which the motion vector points in one of the reference frame lists, retrieve the predictive block from DPB 64, and forward the predictive block to summer 50. Summer 50 then forms a residual video block of pixel difference values by subtracting pixel values of the predictive block provided by motion compensation unit 44 from the pixel values of the current video block being coded. The pixel difference values forming the residual vide block may include luma or chroma difference components or both. Motion compensation unit 44 may also generate syntax elements associated with the video blocks of a video frame for use by video decoder 30 in decoding the video blocks of the video frame. The syntax elements may include, for example, syntax elements defining the motion vector used to identify the predictive block, any flags indicating the prediction mode, or any other syntax information described herein. Note that motion estimation unit 42 and motion compensation unit 44 may be highly integrated, but are illustrated separately for conceptual purposes.

In some implementations, intra BC unit 48 may generate vectors and fetch predictive blocks in a manner similar to that described above in connection with motion estimation unit 42 and motion compensation unit 44, but with the predictive blocks being in the same frame as the current block being coded and with the vectors being referred to as block vectors as opposed to motion vectors. In particular, intra BC unit 48 may determine an intra-prediction mode to use to encode a current block. In some examples, intra BC unit 48 may encode a current block using various intra-prediction modes, e.g., during separate encoding passes, and test their performance through rate-distortion analysis. Next, intra BC unit 48 may select, among the various tested intra-prediction modes, an appropriate intra-prediction mode to use and generate an intra-mode indicator accordingly. For example, intra BC unit 48 may calculate rate-distortion values using a rate-distortion analysis for the various tested intra-prediction modes, and select the intra-prediction mode having the best rate-distortion characteristics among the tested modes as the appropriate intra-prediction mode to use. Rate-distortion analysis generally determines an amount of distortion (or error) between an encoded block and an original, unencoded block that was encoded to produce the encoded block, as well as a bitrate (i.e., a number of bits) used to produce the encoded block. Intra BC unit 48 may calculate ratios from the distortions and rates for the various encoded blocks to determine which intra-prediction mode exhibits the best rate-distortion value for the block.

In other examples, intra BC unit 48 may use motion estimation unit 42 and motion compensation unit 44, in whole or in part, to perform such functions for Intra BC prediction according to the implementations described herein. In either case, for Intra block copy, a predictive block may be a block that is deemed as closely matching the block to be coded, in terms of pixel difference, which may be determined by sum of absolute difference (SAD), sum of squared difference (SSD), or other difference metrics, and identification of the predictive block may include calculation of values for sub-integer pixel positions.

Whether the predictive block is from the same frame according to intra prediction, or a different frame according to inter prediction, video encoder 20 may form a residual video block by subtracting pixel values of the predictive block from the pixel values of the current video block being coded, forming pixel difference values. The pixel difference values forming the residual video block may include both luma and chroma component differences.

Intra prediction processing unit 46 may intra-predict a current video block, as an alternative to the inter-prediction performed by motion estimation unit 42 and motion compensation unit 44, or the intra block copy prediction performed by intra BC unit 48, as described above. In particular, intra prediction processing unit 46 may determine an intra prediction mode to use to encode a current block. To do so, intra prediction processing unit 46 may encode a current block using various intra prediction modes, e.g., during separate encoding passes, and intra prediction processing unit 46 (or a mode select unit, in some examples) may select an appropriate intra prediction mode to use from the tested intra prediction modes. Intra prediction processing unit 46 may provide information indicative of the selected intra-prediction mode for the block to entropy encoding unit 56. Entropy encoding unit 56 may encode the information indicating the selected intra-prediction mode in the bitstream.

After prediction processing unit 41 determines the predictive block for the current video block via either inter prediction or intra prediction, summer 50 forms a residual video block by subtracting the predictive block from the current video block. The residual video data in the residual block may be included in one or more transform units (TUs) and is provided to transform processing unit 52. Transform processing unit 52 transforms the residual video data into residual transform coefficients using a transform, such as a discrete cosine transform (DCT) or a conceptually similar transform.

Transform processing unit 52 may send the resulting transform coefficients to quantization unit 54. Quantization unit 54 quantizes the transform coefficients to further reduce bit rate. The quantization process may also reduce the bit depth associated with some or all of the coefficients. The degree of quantization may be modified by adjusting a quantization parameter. In some examples, quantization unit 54 may then perform a scan of a matrix including the quantized transform coefficients. Alternatively, entropy encoding unit 56 may perform the scan.

Following quantization, entropy encoding unit 56 entropy encodes the quantized transform coefficients into a video bitstream using, e.g., context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. The encoded bitstream may then be transmitted to video decoder 30, or archived in storage device 32 for later transmission to or retrieval by video decoder 30. Entropy encoding unit 56 may also entropy encode the motion vectors and the other syntax elements for the current video frame being coded.

Inverse quantization unit 58 and inverse transform processing unit 60 apply inverse quantization and inverse transformation, respectively, to reconstruct the residual video block in the pixel domain for generating a reference block for prediction of other video blocks. As noted above, motion compensation unit 44 may generate a motion compensated predictive block from one or more reference blocks of the frames stored in DPB 64. Motion compensation unit 44 may also apply one or more interpolation filters to the predictive block to calculate sub-integer pixel values for use in motion estimation.

Summer 62 adds the reconstructed residual block to the motion compensated predictive block produced by motion compensation unit 44 to produce a reference block for storage in DPB 64. The reference block may then be used by intra BC unit 48, motion estimation unit 42 and motion compensation unit 44 as a predictive block to inter predict another video block in a subsequent video frame.

Figure 3:
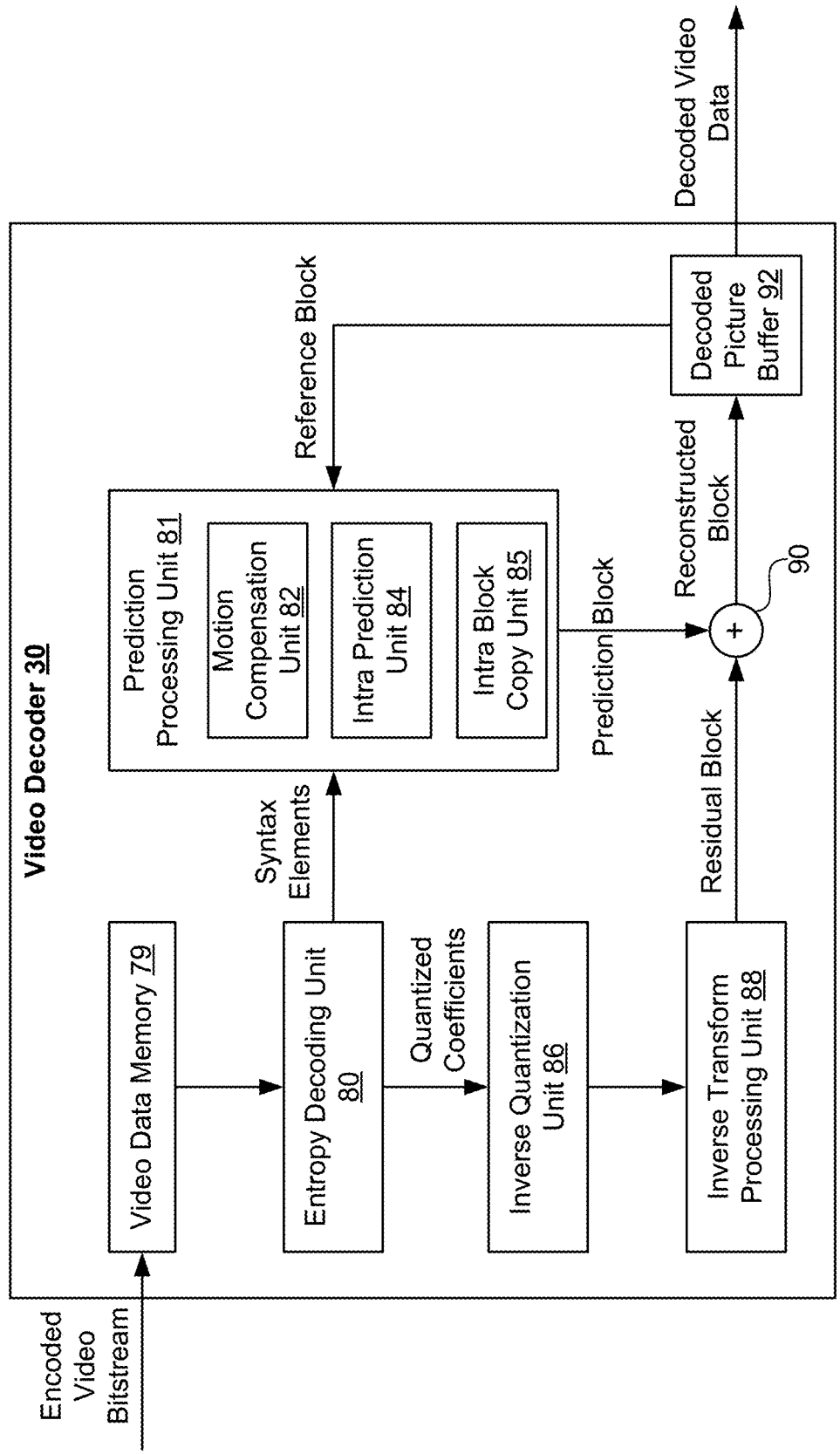
FIG. 3 is a block diagram illustrating an exemplary video decoder in accordance with some implementations of the present disclosure.

FIG. 3 is a block diagram illustrating an exemplary video decoder 30 in accordance with some implementations of the present application. Video decoder 30 includes video data memory 79, entropy decoding unit 80, prediction processing unit 81, inverse quantization unit 86, inverse transform processing unit 88, summer 90, and DPB 92. Prediction processing unit 81 further includes motion compensation unit 82, intra prediction processing unit 84, and intra BC unit 85. Video decoder 30 may perform a decoding process generally reciprocal to the encoding process described above with respect to video encoder 20 in connection with FIG. 2. For example, motion compensation unit 82 may generate prediction data based on motion vectors received from entropy decoding unit 80, while intra-prediction unit 84 may generate prediction data based on intra-prediction mode indicators received from entropy decoding unit 80.

In some examples, a unit of video decoder 30 may be tasked to perform the implementations of the present application. Also, in some examples, the implementations of the present disclosure may be divided among one or more of the units of video decoder 30. For example, intra BC unit 85 may perform the implementations of the present application, alone, or in combination with other units of video decoder 30, such as motion compensation unit 82, intra prediction processing unit 84, and entropy decoding unit 80. In some examples, video decoder 30 may not include intra BC unit 85 and the functionality of intra BC unit 85 may be performed by other components of prediction processing unit 81, such as motion compensation unit 82.

Video data memory 79 may store video data, such as an encoded video bitstream, to be decoded by the other components of video decoder 30. The video data stored in video data memory 79 may be obtained, for example, from storage device 32, from a local video source, such as a camera, via wired or wireless network communication of video data, or by accessing physical data storage media (e.g., a flash drive or hard disk). Video data memory 79 may include a coded picture buffer (CPB) that stores encoded video data from an encoded video bitstream. Decoded picture buffer (DPB) 92 of video decoder 30 stores reference video data for use in decoding video data by video decoder 30 (e.g., in intra or inter predictive coding modes). Video data memory 79 and DPB 92 may be formed by any of a variety of memory devices, such as dynamic random access memory (DRAM), including synchronous DRAM (SDRAM), magneto-resistive RAM (MRAM), resistive RAM (RRAM), or other types of memory devices. For illustrative purpose, video data memory 79 and DPB 92 are depicted as two distinct components of video decoder 30 in FIG. 3. But it will be apparent to one skilled in the art that video data memory 79 and DPB 92 may be provided by the same memory device or separate memory devices. In some examples, video data memory 79 may be on-chip with other components of video decoder 30, or off-chip relative to those components.

During the decoding process, video decoder 30 receives an encoded video bitstream that represents video blocks of an encoded video frame and associated syntax elements. Video decoder 30 may receive the syntax elements at the video frame level and/or the video block level. Entropy decoding unit 80 of video decoder 30 entropy decodes the bitstream to generate quantized coefficients, motion vectors or intra-prediction mode indicators, and other syntax elements. Entropy decoding unit 80 then forwards the motion vectors and other syntax elements to prediction processing unit 81.

When the video frame is coded as an intra predictive coded (I) frame or for intra coded predictive blocks in other types of frames, intra prediction processing unit 84 of prediction processing unit 81 may generate prediction data for a video block of the current video frame based on a signaled intra prediction mode and reference data from previously decoded blocks of the current frame.

When the video frame is coded as an inter-predictive coded (i.e., B or P) frame, motion compensation unit 82 of prediction processing unit 81 produces one or more predictive blocks for a video block of the current video frame based on the motion vectors and other syntax elements received from entropy decoding unit 80. Each of the predictive blocks may be produced from a reference frame within one of the reference frame lists. Video decoder 30 may construct the reference frame lists, List 0 and List 1, using default construction techniques based on reference frames stored in DPB 92.

In some examples, when the video block is coded according to the intra BC mode described herein, intra BC unit 85 of prediction processing unit 81 produces predictive blocks for the current video block based on block vectors and other syntax elements received from entropy decoding unit 80. The predictive blocks may be within a reconstructed region of the same picture as the current video block defined by video encoder 20.

Motion compensation unit 82 and/or intra BC unit 85 determines prediction information for a video block of the current video frame by parsing the motion vectors and other syntax elements, and then uses the prediction information to produce the predictive blocks for the current video block being decoded. For example, motion compensation unit 82 uses some of the received syntax elements to determine a prediction mode (e.g., intra or inter prediction) used to code video blocks of the video frame, an inter prediction frame type (e.g., B or P), construction information for one or more of the reference frame lists for the frame, motion vectors for each inter predictive encoded video block of the frame, inter prediction status for each inter predictive coded video block of the frame, and other information to decode the video blocks in the current video frame.

Similarly, intra BC unit 85 may use some of the received syntax elements, e.g., a flag, to determine that the current video block was predicted using the intra BC mode, construction information of which video blocks of the frame are within the reconstructed region and should be stored in DPB 92, block vectors for each intra BC predicted video block of the frame, intra BC prediction status for each intra BC predicted video block of the frame, and other information to decode the video blocks in the current video frame.

Motion compensation unit 82 may also perform interpolation using the interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes the quantized transform coefficients provided in the bitstream and entropy decoded by entropy decoding unit 80 using the same quantization parameter calculated by video encoder 20 for each video block in the video frame to determine a degree of quantization. Inverse transform processing unit 88 applies an inverse transform, e.g., an inverse DCT, an inverse integer transform, or a conceptually similar inverse transform process, to the transform coefficients in order to reconstruct the residual blocks in the pixel domain.

After motion compensation unit 82 or intra BC unit 85 generates the predictive block for the current video block based on the vectors and other syntax elements, summer 90 reconstructs decoded video block for the current video block by summing the residual block from inverse transform processing unit 88 and a corresponding predictive block generated by motion compensation unit 82 and intra BC unit 85. An in-loop filter (not pictured) may be positioned between summer 90 and DPB 92 to further process the decoded video block. The decoded video blocks in a given frame are then stored in DPB 92, which stores reference frames used for subsequent motion compensation of next video blocks. DPB 92, or a memory device separate from DPB 92, may also store decoded video for later presentation on a display device, such as display device 34 of FIG. 1.

In a typical video coding process, a video sequence typically includes an ordered set of frames or pictures. Each frame may include three sample arrays, denoted SL, SCb, and SCr. SL is a two-dimensional array of luma samples. SCb is a two-dimensional array of Cb chroma samples. SCr is a two-dimensional array of Cr chroma samples. In other instances, a frame may be monochrome and therefore includes only one two-dimensional array of luma samples.

Figure 4A:
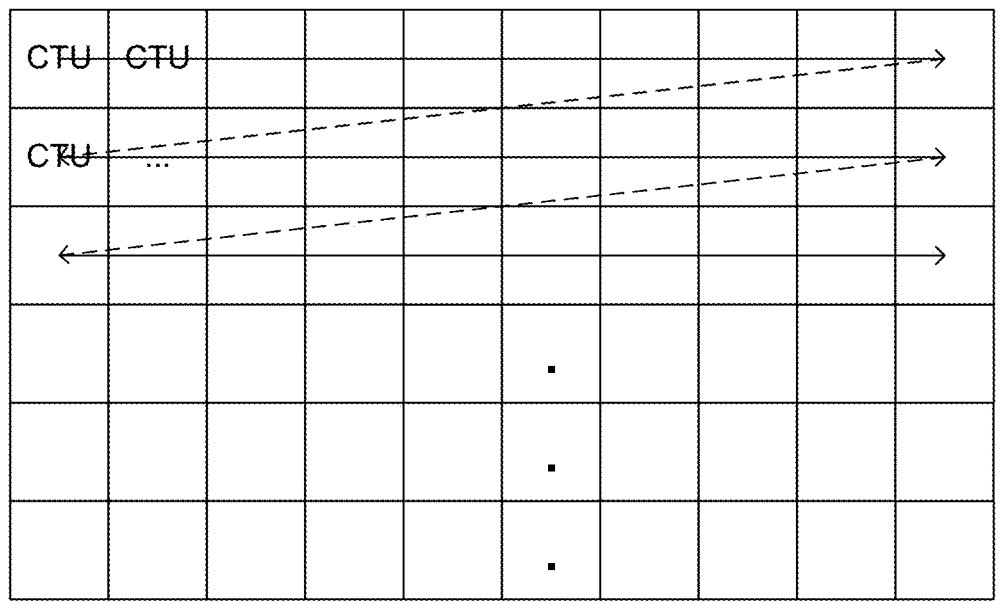
FIGS. 4A through 4E are block diagrams illustrating how a frame is recursively partitioned into multiple video blocks of different sizes and shapes in accordance with some implementations of the present disclosure.
Figure 4B:
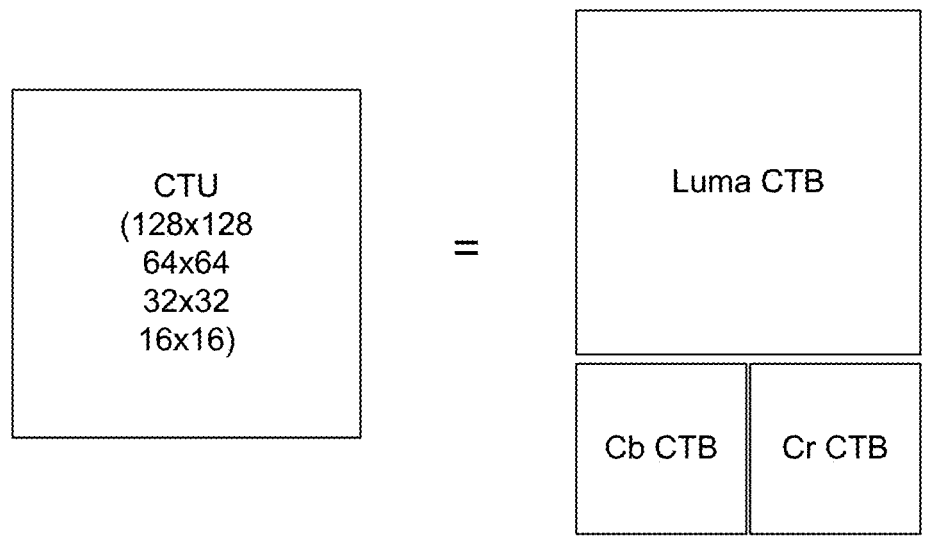

As shown in FIG. 4A, video encoder 20 (or more specifically partition unit 45) generates an encoded representation of a frame by first partitioning the frame into a set of coding tree units (CTUs). A video frame may include an integer number of CTUs ordered consecutively in a raster scan order from left to right and from top to bottom. Each CTU is a largest logical coding unit and the width and height of the CTU are signaled by the video encoder 20 in a sequence parameter set, such that all the CTUs in a video sequence have the same size being one of 128×128, 64×64, 32×32, and 16×16. But it should be noted that the present application is not necessarily limited to a particular size. As shown in FIG. 4B, each CTU may comprise one coding tree block (CTB) of luma samples, two corresponding coding tree blocks of chroma samples, and syntax elements used to code the samples of the coding tree blocks. The syntax elements describe properties of different types of units of a coded block of pixels and how the video sequence can be reconstructed at the video decoder 30, including inter or intra prediction, intra prediction mode, motion vectors, and other parameters. In monochrome pictures or pictures having three separate color planes, a CTU may comprise a single coding tree block and syntax elements used to code the samples of the coding tree block. A coding tree block may be an N×N block of samples.

Figure 4C:
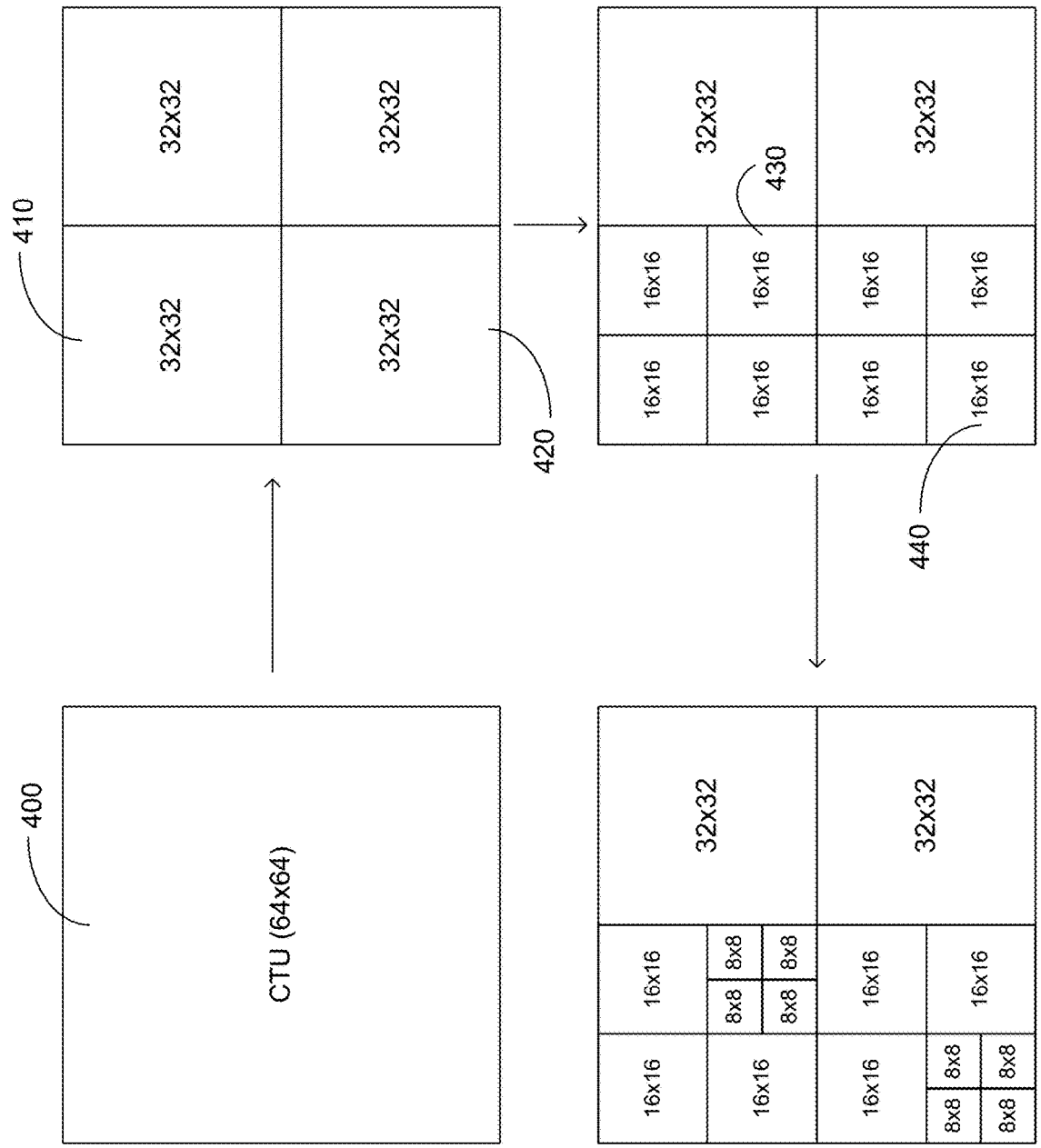
Figure 4D:
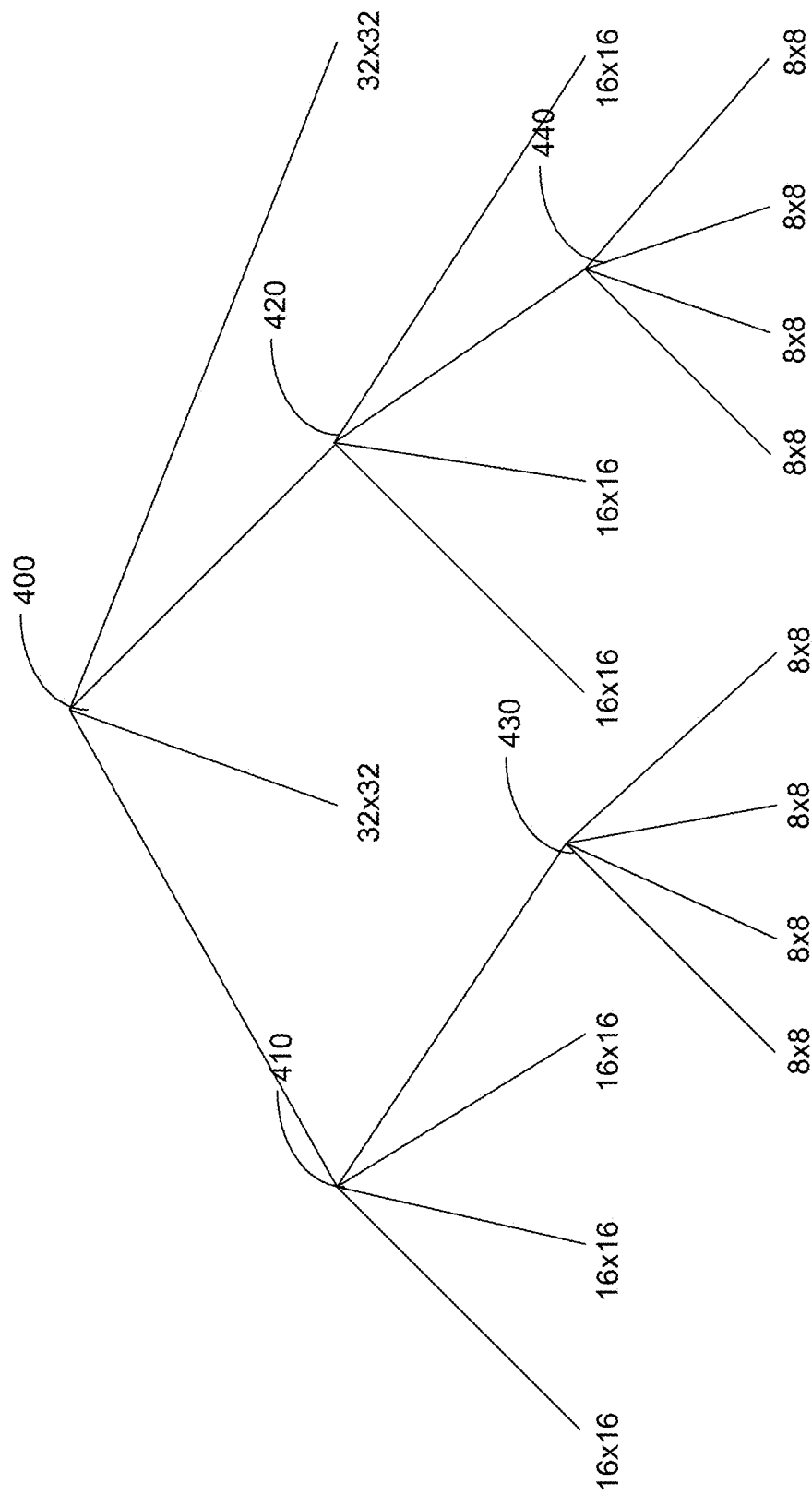
Figure 4E:
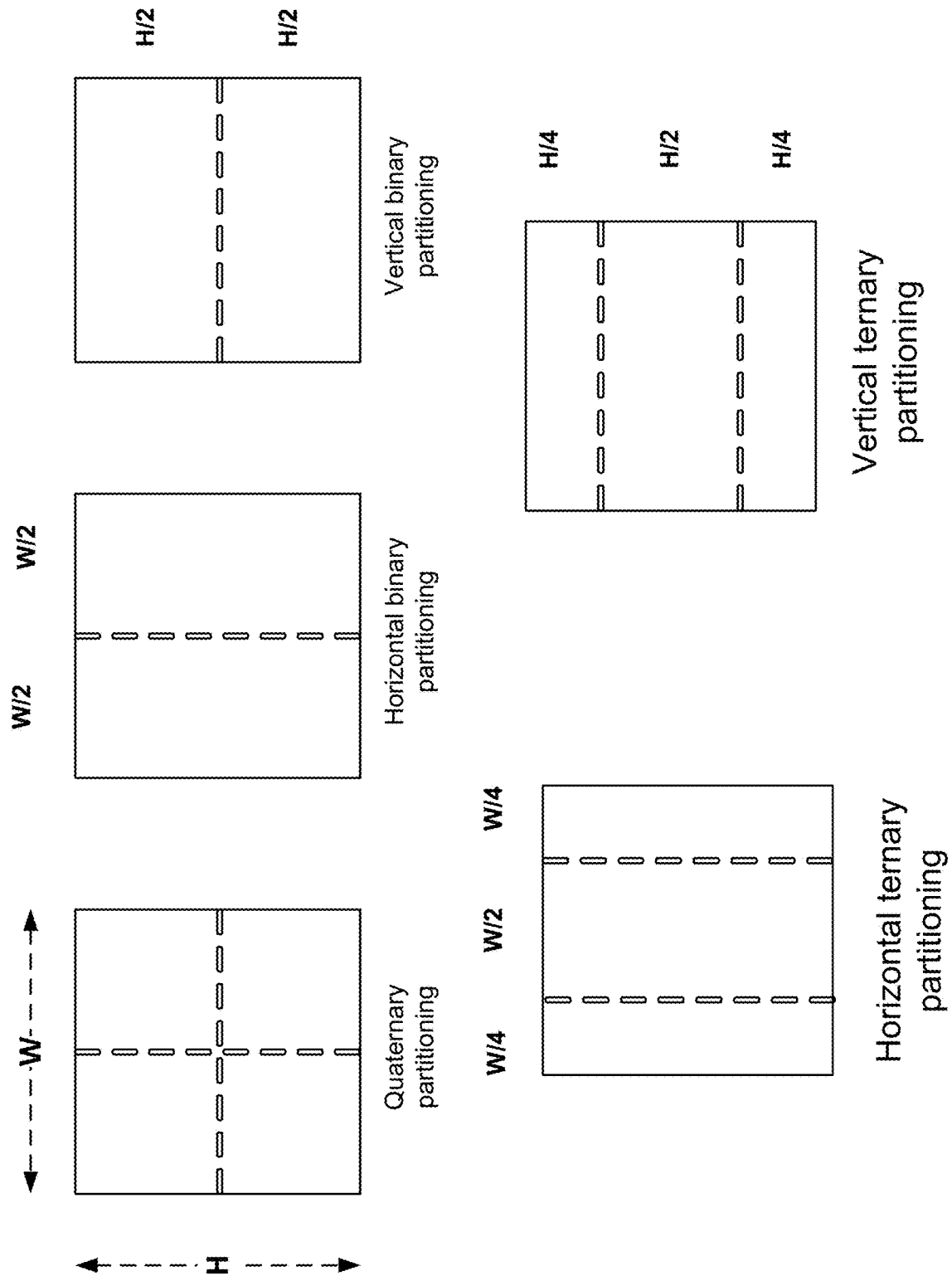

To achieve a better performance, video encoder 20 may recursively perform tree partitioning such as binary-tree partitioning, ternary-tree partitioning, quad-tree partitioning or a combination of both on the coding tree blocks of the CTU and divide the CTU into smaller coding units (CUs). As depicted in FIG. 4C, the 64×64 CTU 400 is first divided into four smaller CU, each having a block size of 32×32. Among the four smaller CUs, CU 410 and CU 420 are each divided into four CUs of 16×16 by block size. The two 16×16 CUs 430 and 440 are each further divided into four CUs of 8×8 by block size. FIG. 4D depicts a quad-tree data structure illustrating the end result of the partition process of the CTU 400 as depicted in FIG. 4C, each leaf node of the quad-tree corresponding to one CU of a respective size ranging from 32×32 to 8×8. Like the CTU depicted in FIG. 4B, each CU may comprise a coding block (CB) of luma samples and two corresponding coding blocks of chroma samples of a frame of the same size, and syntax elements used to code the samples of the coding blocks. In monochrome pictures or pictures having three separate color planes, a CU may comprise a single coding block and syntax structures used to code the samples of the coding block. It should be noted that the quad-tree partitioning depicted in FIGS. 4C and 4D is only for illustrative purposes and one CTU can be split into CUs to adapt to varying local characteristics based on quad/ternary/binary-tree partitions. In the multi-type tree structure, one CTU is partitioned by a quad-tree structure and each quad-tree leaf CU can be further partitioned by a binary and ternary tree structure. As shown in FIG. 4E, there are five partitioning types, i.e., quaternary partitioning, horizontal binary partitioning, vertical binary partitioning, horizontal ternary partitioning, and vertical ternary partitioning.

In some implementations, video encoder 20 may further partition a coding block of a CU into one or more M×N prediction blocks (PB). A prediction block is a rectangular (square or non-square) block of samples on which the same prediction, inter or intra, is applied. A prediction unit (PU) of a CU may comprise a prediction block of luma samples, two corresponding prediction blocks of chroma samples, and syntax elements used to predict the prediction blocks. In monochrome pictures or pictures having three separate color planes, a PU may comprise a single prediction block and syntax structures used to predict the prediction block. Video encoder 20 may generate predictive luma, Cb, and Cr blocks for luma, Cb, and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the frame associated with the PU. If video encoder 20 uses inter prediction to generate the predictive blocks of a PU, video encoder 20 may generate the predictive blocks of the PU based on decoded samples of one or more frames other than the frame associated with the PU.

After video encoder 20 generates predictive luma, Cb, and Cr blocks for one or more PUs of a CU, video encoder 20 may generate a luma residual block for the CU by subtracting the CU's predictive luma blocks from its original luma coding block such that each sample in the CU's luma residual block indicates a difference between a luma sample in one of the CU's predictive luma blocks and a corresponding sample in the CU's original luma coding block. Similarly, video encoder 20 may generate a Cb residual block and a Cr residual block for the CU, respectively, such that each sample in the CU's Cb residual block indicates a difference between a Cb sample in one of the CU's predictive Cb blocks and a corresponding sample in the CU's original Cb coding block and each sample in the CU's Cr residual block may indicate a difference between a Cr sample in one of the CU's predictive Cr blocks and a corresponding sample in the CU's original Cr coding block.

Furthermore, as illustrated in FIG. 4C, video encoder 20 may use quad-tree partitioning to decompose the luma, Cb, and Cr residual blocks of a CU into one or more luma, Cb, and Cr transform blocks. A transform block is a rectangular (square or non-square) block of samples on which the same transform is applied. A transform unit (TU) of a CU may comprise a transform block of luma samples, two corresponding transform blocks of chroma samples, and syntax elements used to transform the transform block samples. Thus, each TU of a CU may be associated with a luma transform block, a Cb transform block, and a Cr transform block. In some examples, the luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients. Finally, video encoder 20 may output a bitstream that includes a sequence of bits that forms a representation of coded frames and associated data, which is either saved in storage device 32 or transmitted to destination device 14.

After receiving a bitstream generated by video encoder 20, video decoder 30 may parse the bitstream to obtain syntax elements from the bitstream. Video decoder 30 may reconstruct the frames of the video data based at least in part on the syntax elements obtained from the bitstream. The process of reconstructing the video data is generally reciprocal to the encoding process performed by video encoder 20. For example, video decoder 30 may perform inverse transforms on the coefficient blocks associated with TUs of a current CU to reconstruct residual blocks associated with the TUs of the current CU. Video decoder 30 also reconstructs the coding blocks of the current CU by adding the samples of the predictive blocks for PUs of the current CU to corresponding samples of the transform blocks of the TUs of the current CU. After reconstructing the coding blocks for each CU of a frame, video decoder 30 may reconstruct the frame.

In some embodiments, there are different ways of signaling prediction modes. In VVC, each CU could be coded as skip mode or non-skip mode. For a CU coded as non-skip mode, syntax elements are further signaled to indicate if the current CU is coded as intra mode, inter mode, intra block copy (IBC) mode or palette (PLT) mode. These modes are termed as "MODE INTRA", "MODE INTER", "MODE IBC" and "MODE PLT" respectively in the VVC specification. For a CU coded as inter mode, the prediction signal can be generated by the pixels from the reference pictures which are not the current picture. Moreover, one flag is further signaled for a CU coded as inter mode to indicate whether current CU is merge mode. For a merge mode coded CU, several different types of merge modes are further signaled using additional syntax elements. These different types of merge modes including regular merge modes, subblock merge modes, merge mode with MV difference (MMVD), combined inter and intra prediction (CIIP) and triangle merge mode. There merge modes are illustrated in the following sections.

In some embodiments, in VVC, the merge candidate list is constructed by including the following five types of candidates in order: Spatial MVP (i.e. motion vector predictor) from spatial neighbour CUs, Temporal MVP from collocated CUs, History-based MVP from a FIFO table, Pairwise average MVP, and Zero MVs.

The size of merge list is signaled in slice header and the maximum allowed size of merge list is 6 in VVC. For each CU code in merge mode, an index of best merge candidate is encoded using truncated unary binarization (TU). The first bin of the merge index is coded with context and bypass coding is used for other bins. In the following context of this disclosure, this extended merge mode is also called regular merge mode since its concept is the same as the merge mode used in HEVC.

In some embodiments, in addition to the merge mode, where the implicitly derived motion information is directly used for prediction samples generation of the current CU, the merge mode with motion vector differences (MMVD) is introduced in VVC. A MMVD flag is singnaled right after sending a skip flag and merge flag to specify whehther MMVD mode is used for a CU.

In MMVD, after a merge candidate is selected, it is further refined by the signaled MVDs information. The further information includes a merge candidate flag, an index to specify motion magnitude, and an index for indication of motion direction. In MMVD mode, one for the first two candidates in the merge list is selected to be used as motion vector (MV) basis. The merge candidate flag is signaled to specify which one is used.

Distance index specifies motion magnitude information and indicate the pre-defined offset from the starting point. An offset is added to either horizontal component or vertical component of starting MV. The relation of distance index and pre-defined offset is specified in Table 1

TABLE 1

| The relation of distance index and pre-defined offset | | | | | | | | |
|---|---|---|---|---|---|---|---|---|
| Distance IDX | 0 | 1 | 2 | 3 | 4 | 5 | 6 | 7 |
| Offset (in unit of luma sample) | 1/4 | 1/2 | 1 | 2 | 4 | 8 | 16 | 32 |

Direction index represents the direction of the MVD relative to the starting point. The direction index can represent of the four directions as shown in Table 2. It's noted that the meaning of MVD sign could be variant according to the information of starting MVs. When the starting MVs is an un-prediction MV or bi-prediction MVs with both lists point to the same side of the current picture (i.e., POCs of two references are both larger than the POC of the current picture, or are both smaller than the POC of the current picture), the sign in Table 2 specifies the sign of MV offset added to the starting MV. When the starting MVs is bi-prediction MVs with the two MVs point to the different sides of the current picture (i.e. the Picture Order Count (POC) of one reference is larger than the POC of the current picture, and the POC of the other reference is smaller than the POC of the current picture), the sign in Table 2 specifies the sign of MV offset added to the list0 MV component of starting MV and the sign for the list1 MV has opposite value.

TABLE 2

Sign of MV offset specified by direction index

| | Direction IDX | | | |
|---|---|---|---|---|
| | 00 | 01 | 10 | 11 |
| x-axis | + | − | N/A | N/A |
| y-axis | N/A | N/A | + | − |

In some embodiments, in VVC, a combined sub-block based merge list which contains both subblock-based temporal motion vector prediction (SbTMVP) candidate and affine merge candidates is used for the signaling of sub-block based merge mode. In the following context, it is called subblock merge mode. The SbTMVP mode is enabled/disabled by a sequence parameter set (SPS) flag. If the SbTMVP mode is enabled, the SbTMVP predictor is added as the first entry of the list of sub-block based merge candidates, and followed by the affine merge candidates. The size of sub-block based merge list is signaled in SPS and the maximum allowed size of the sub-block based merge list is 5 in VVC.

The sub-CU size used in SbTMVP is fixed to be 8×8, and as done for affine merge mode, SbTMVP mode is only applicable to the CU with both width and height are larger than or equal to 8.

The encoding logic of the additional SbTMVP merge candidate is the same as for the other merge candidates, that is, for each CU in forward-predicted frame (P) or bi-directionally predicted frame (B) slice, an additional rate-distortion (RD) check is performed to decide whether to use the SbTMVP candidate.

In some embodiments, VVC supports the subblock-based temporal motion vector prediction (SbTMVP) method. Similar to the temporal motion vector prediction (TMVP) in HEVC, SbTMVP uses the motion field in the collocated picture to improve motion vector prediction and merge mode for CUs in the current picture. The same collocated picture used by TMVP is used for SbTMVP. SbTMVP differs from TMVP in the following two main aspects. First, TMVP predicts motion at CU level but SbTMVP predicts motion at sub-CU level; Second, whereas TMVP fetches the temporal motion vectors from the collocated block in the collocated picture (the collocated block is the bottom-right or center block relative to the current CU), SbTMVP applies a motion shift before fetching the temporal motion information from the collocated picture, where the motion shift is obtained from the motion vector from one of the spatial neighboring blocks of the current CU.

Figures 5A, 5B:
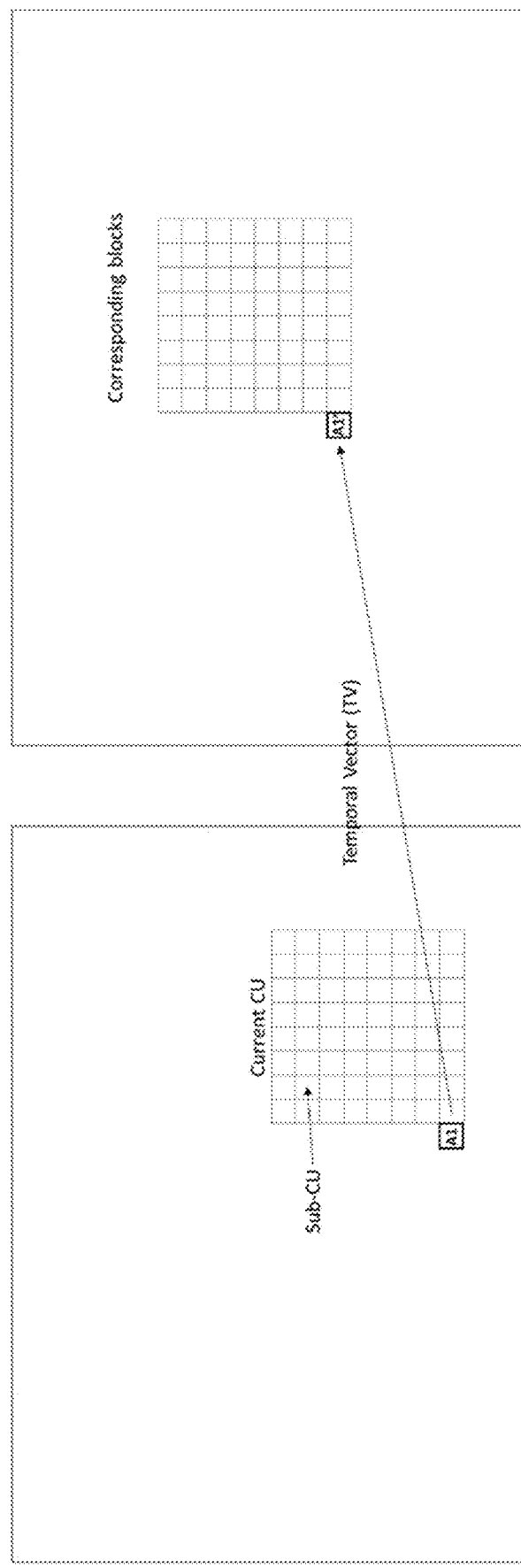
FIGS. 5A and 5B are block diagrams illustrating an exemplary subblock-based temporal motion vector prediction (SbTMVP) process in VVC in accordance with some implementations of the present disclosure.

FIGS. 5A and 5B are block diagrams illustrating an exemplary SbTMVP process in VVC in accordance with some implementations of the present disclosure. In some embodiments, a sub-CU motion field is derived by applying a temporal vector (or termed motion shift) from spatial neighbor and scaling the motion information from the corresponding collocated sub-CUs.

The SbTMVP process is illustrated in FIGS. 5A and 5B. SbTMVP predicts the motion vectors of the sub-CUs within the current CU in two steps. In the first step, the spatial neighbor A1 in FIG. 5A is examined. If A1 has a motion vector that uses the collocated picture as its reference picture, this motion vector is selected to be the motion shift to be applied. If no such motion is identified, then the motion shift is set to (0, 0).

In the second step, the motion shift identified in Step 1 is applied (i.e. added to the current block's coordinates) to obtain sub-CU-level motion information (motion vectors and reference indices) from the collocated picture as shown in FIG. 5B. The example in FIG. 5B assumes the motion shift is set to block A1's motion. Then, for each sub-CU, the motion information of its corresponding block (the smallest motion grid that covers the center sample) in the collocated picture is used to derive the motion information for the sub-CU. After the motion information of the collocated sub-CU is identified, it is converted to the motion vectors and reference indices of the current sub-CU in a similar way as the TMVP process of HEVC, where temporal motion scaling is applied to align the reference pictures of the temporal motion vectors to those of the current CU.

In VVC, a combined subblock based merge list which contains both SbTMVP candidate and affine merge candidates is used for the signaling of subblock based merge mode. The SbTMVP mode is enabled/disabled by a sequence parameter set (SPS) flag. If the SbTMVP mode is enabled, the SbTMVP predictor is added as the first entry of the list of subblock based merge candidates, and followed by the affine merge candidates. The size of subblock based merge list is signaled in SPS and the maximum allowed size of the subblock based merge list is 5 in VVC.

The sub-CU size used in SbTMVP is fixed to be 8×8, and as done for affine merge mode, SbTMVP mode is only applicable to the CU with both width and height are larger than or equal to 8.

The encoding logic of the additional SbTMVP merge candidate is the same as for the other merge candidates, that is, for each CU in P or B slice, an additional RD check is performed to decide whether to use the SbTMVP candidate.

In some embodiments, in HEVC, only translation motion model is applied for motion compensated prediction (MCP). While in the real world, there are many kinds of motion, e.g. zoom in/out, rotation, perspective motions and the other irregular motions. In the VVC, a block-based affine transform motion compensation prediction is applied.

Figure 6B:
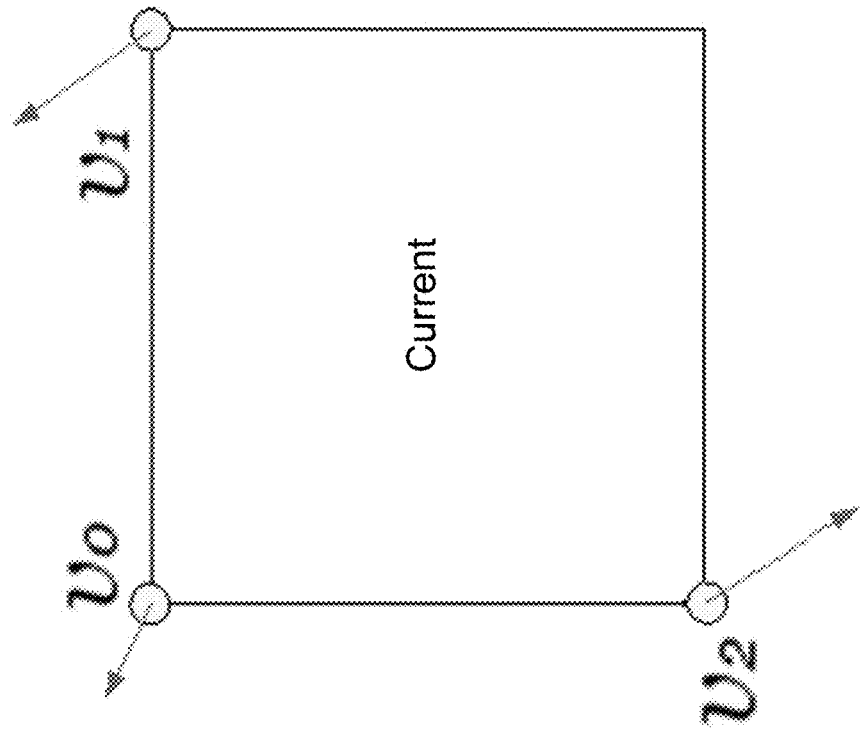
FIGS. 6A and 6B are block diagrams illustrating an exemplary control point based affine motion model in accordance with some implementations of the present disclosure.
Figure 6A:
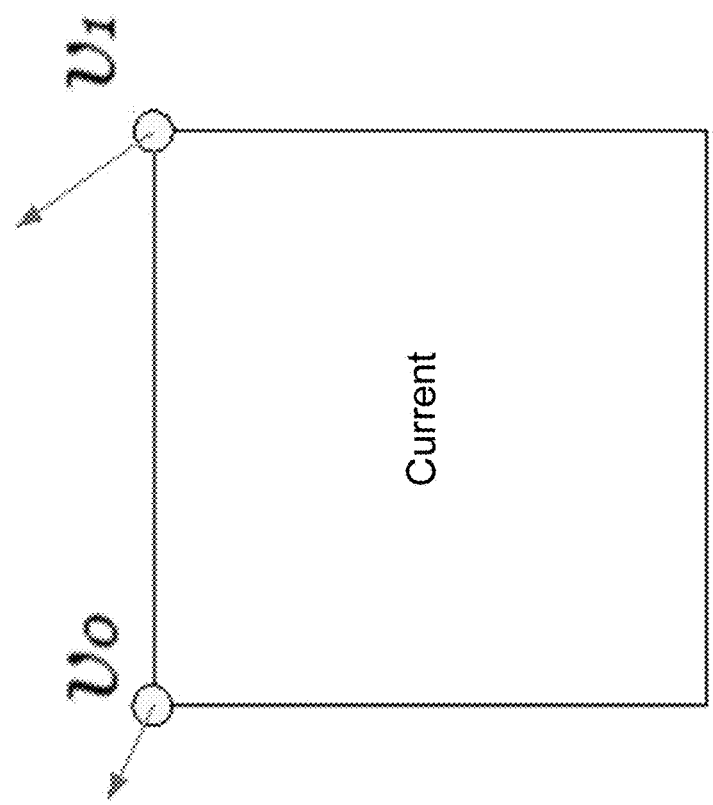

FIGS. 6A and 6B are block diagrams illustrating an exemplary control point based affine motion model in accordance with some implementations of the present disclosure. FIG. 6A illustrates a 4 parameter affine model. FIG. 6B illustrates 6 parameter affine model.

As shown FIGS. 6A and 6B, the affine motion field of the block is described by motion information of two control point (4-parameter) V0 and V1 or three control point motion vectors (6-parameter), V0, V1 and V2.

For 4-parameter affine motion model, motion vector at sample location (x, y) in a block is derived as:

$$\begin{cases} mv_x = \dfrac{mv_{1x} - mv_{0x}}{W}x + \dfrac{mv_{1y} - mv_{0y}}{W}y + mv_{0x} \\ mv_y = \dfrac{mv_{1y} - mv_{0y}}{W}x + \dfrac{mv_{1y} - mv_{0x}}{W}y + mv_{0y} \end{cases}$$

For 6-parameter affine motion model, motion vector at sample location (x, y) in a block is derived as:

$$\begin{cases} mv_x = \dfrac{mv_{1x} - mv_{0x}}{W}x + \dfrac{mv_{2x} - mv_{0x}}{H}y + mv_{0x} \\ mv_y = \dfrac{mv_{1y} - mv_{0y}}{W}x + \dfrac{mv_{2y} - mv_{0y}}{H}y + mv_{0y} \end{cases}$$

Where ($mv_{0x}$, $mv_{0y}$) is motion vector of the top-left corner control point, ($mv_{1x}$, $mv_{1y}$) is motion vector of the top-right corner control point, and ($mv_{2x}$, $mv_{2y}$) is motion vector of the bottom-left corner control point. W is the width and H is the height of the block.

Figure 7:
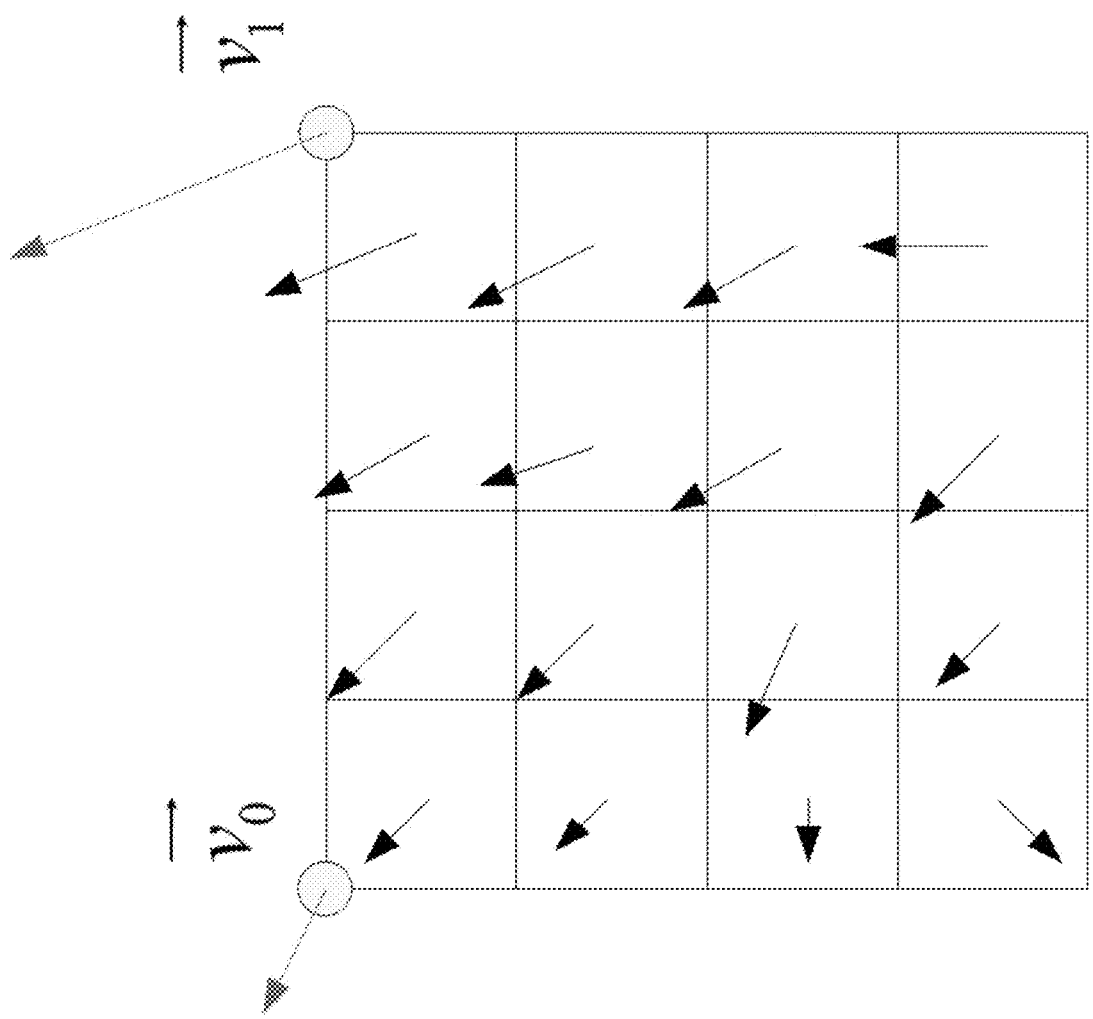
FIG. 7 is a block diagram illustrating an exemplary affine motion vector prediction (AMVP) per sub-block in accordance with some implementations of the present disclosure.

FIG. 7 is a block diagram illustrating an exemplary affine motion vector prediction (AMVP) per sub-block in accordance with some implementations of the present disclosure. In order to simplify the motion compensation prediction, block based affine transform prediction is applied. To derive motion vector of each 4×4 luma sub-block, the motion vector of the center sample of each sub-block, as shown in FIG. 7, is calculated according to above equations, and rounded to 1/16 fraction accuracy. Then the motion compensation interpolation filters are applied to generate the prediction of each sub-block with derived motion vector. The sub-block size of chroma-components is also set to be 4×4. The MV of a 4×4 chroma sub-block is calculated as the average of the MVs of the four corresponding 4×4 luma sub-blocks.

As done for translational motion inter prediction, there are also two affine motion inter prediction modes: affine merge mode and AMVP mode.

In some embodiments, affine merge prediction mode (AF_MERGE mode) can be applied for CUs with both width and height larger than or equal to 8. In this mode the control point motion vectors (CPMVs) of the current CU are generated based on the motion information of the spatial neighboring CUs. There can be up to five CPMV predictor (CPMVP) candidates and an index is signaled to indicate the one that is used for the current CU. The following three types of CPMVP candidates are used to form the affine merge candidate list: (1) Inherited affine merge candidates that are extrapolated from the CPMVs of the neighbour CUs; (2) Constructed affine merge CPMVPs that are derived using the translational MVs of the neighbour CUs; (3) Zero MVs.

Figure 8:
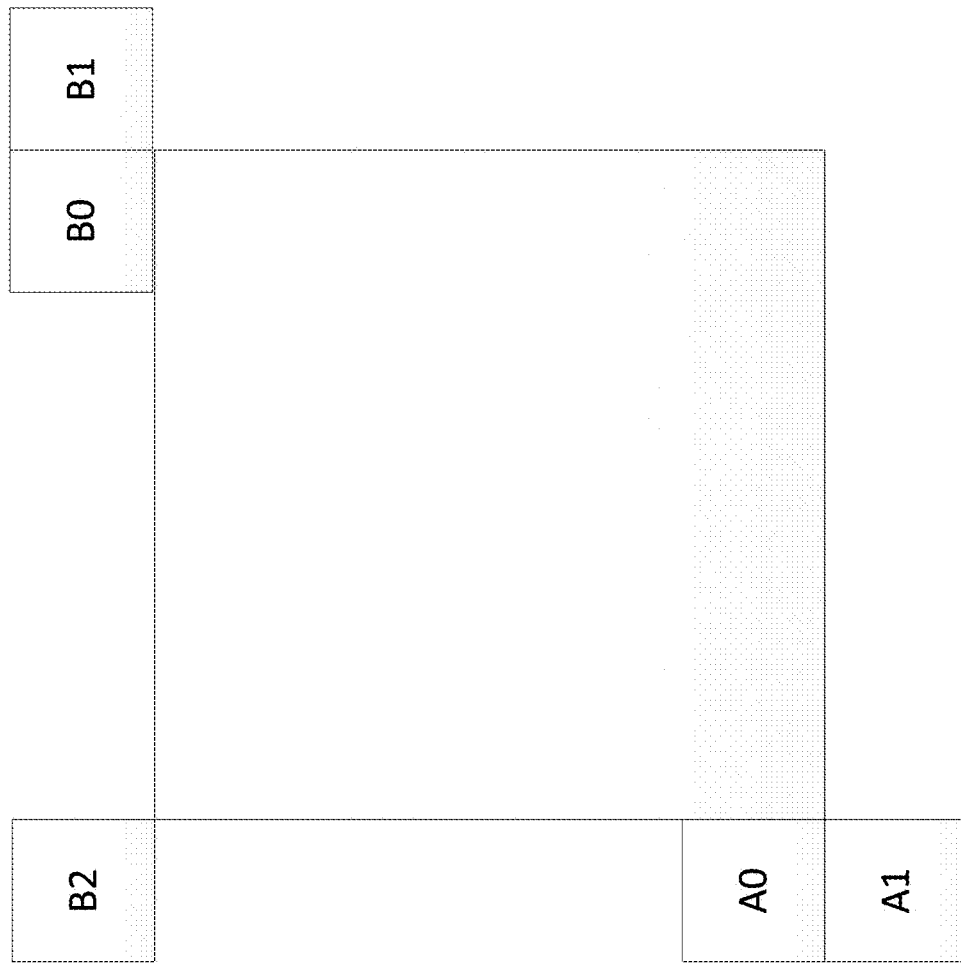
FIG. 8 is a block diagram illustrating the exemplary locations of inherited affine motion predictors in accordance with some implementations of the present disclosure.

FIG. 8 is a block diagram illustrating the exemplary locations of inherited affine motion predictors in accordance with some implementations of the present disclosure. In VVC, there are maximum two inherited affine candidates which are derived from affine motion model of the neighboring blocks, one from left neighboring CUs and one from above neighboring CUs. The candidate blocks are shown in FIG. 8. For the left predictor, the scan order is A0→A1, and for the above predictor, the scan order is B0→B1→B2. Only the first inherited candidate from each side is selected. No pruning check is performed between two inherited candidates. When a neighboring affine CU is identified, its control point motion vectors are used to derive the CPMVP candidate in the affine merge list of the current CU.

Figure 9:
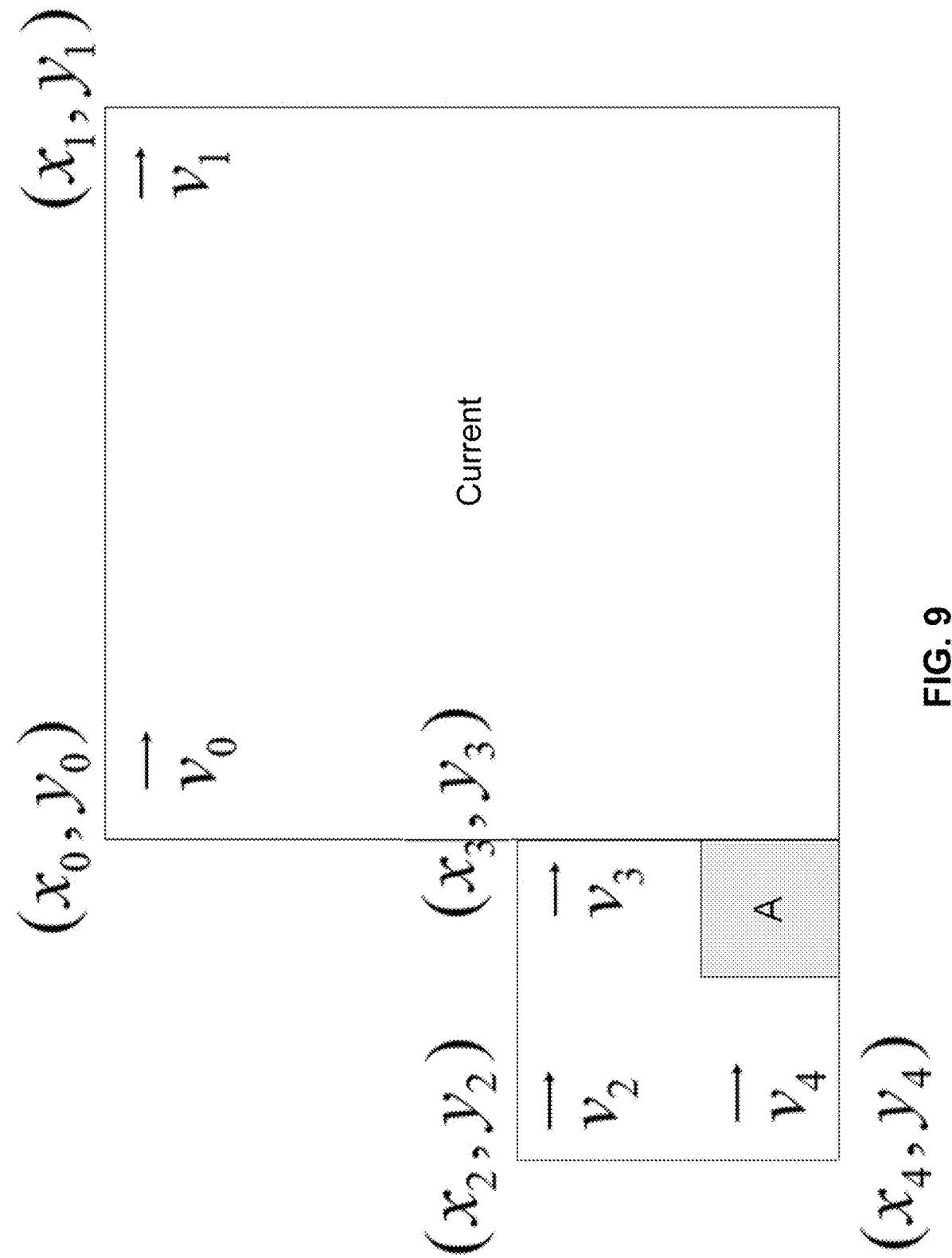
FIG. 9 is a block diagram illustrating the exemplary control point motion vector inheritance in accordance with some implementations of the present disclosure.

FIG. 9 is a block diagram illustrating the exemplary control point motion vector inheritance in accordance with some implementations of the present disclosure. As shown in FIG. 9, if the neighboring left bottom block A is coded in affine mode, the motion vectors $v_2$, $v_3$ and $v_4$ of the top left corner, above right corner and left bottom corner of the CU which contains the block A are attained. When block A is coded with 4-parameter affine model, the two CPMVs of the current CU are calculated according to $v_2$, and $v_3$. In case that block A is coded with 6-parameter affine model, the three CPMVs of the current CU are calculated according to $v_2$, $v_3$ and $v_4$.

Figure 10:
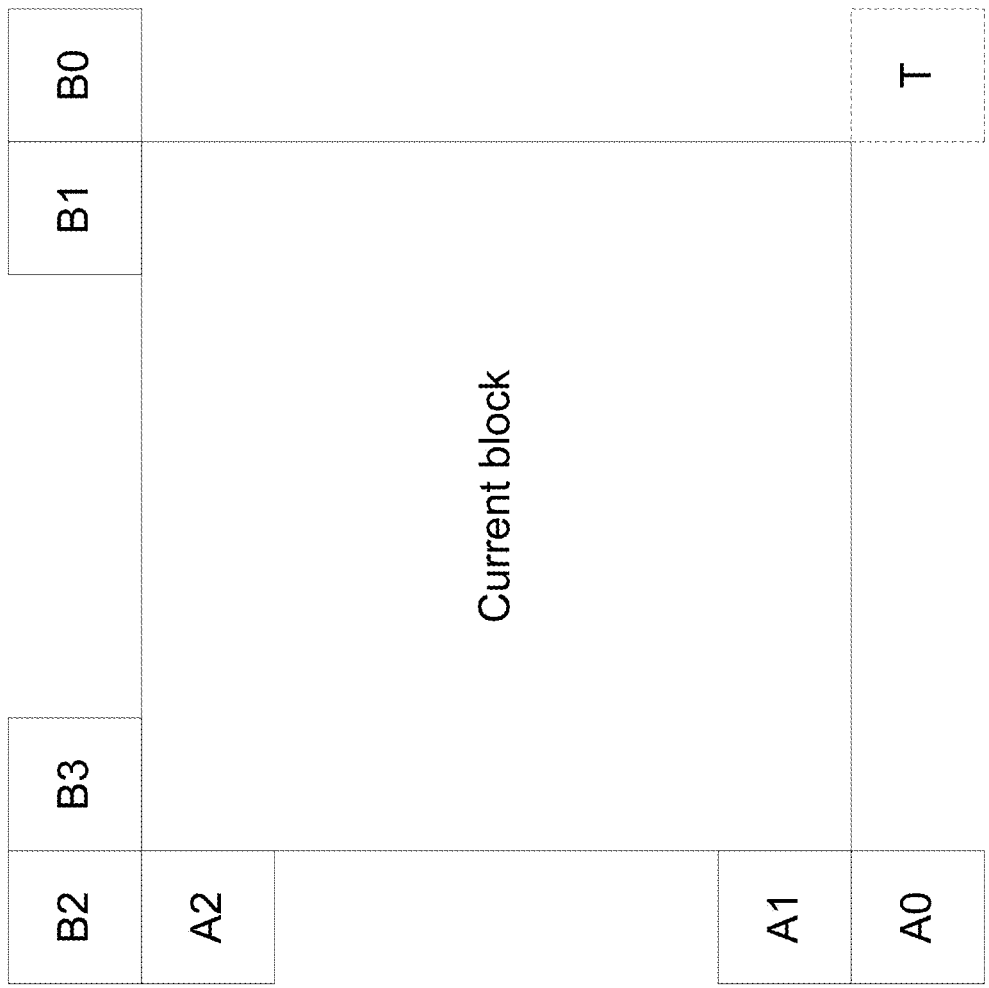
FIG. 10 is a block diagram illustrating the exemplary locations of candidate positions for constructed affine merge mode in accordance with some implementations of the present disclosure.

FIG. 10 is a block diagram illustrating the exemplary locations of candidate positions for constructed affine merge mode in accordance with some implementations of the present disclosure. A constructed affine candidate is constructed by combining the neighbor translational motion information of each control point. The motion information for the control points is derived from the specified spatial neighbors and temporal neighbor shown in FIG. 10. $CPMV_k$ (k=1, 2, 3, 4) represents the k-th control point. For $CPMV_1$, the B2→B3→A2 blocks are checked in order and the MV of the first available block is used. Likewise, $CPMV_2$ is derived by checking the B1→B0 blocks in order. $CPMV_3$ is derived by checking the A1→A0 blocks in order. TMVP is used as $CPMV_4$ if it's available.

After MVs of four control points are obtained, affine merge candidates are constructed based on those motion information. The following combinations of control point MVs are used to construct in order:

{$CPMV_1$, $CPMV_2$, $CPMV_3$}, {$CPMV_1$, $CPMV_2$, $CPMV_4$}, {$CPMV_1$, $CPMV_3$, $CPMV_4$}, {$CPMV_2$, $CPMV_3$, $CPMV_4$}, {$CPMV_1$, $CPMV_2$}, {$CPMV_1$, $CPMV_3$}

The combination of 3 CPMVs can be used to construct a 6-parameter affine merge candidate and the combination of 2 CPMVs can be used to construct a 4-parameter affine merge candidate. To avoid motion scaling process, if the reference indices of control points are different, the related combination of control point MVs is discarded.

After inherited affine merge candidates and constructed affine merge candidate are checked, if the list is still not full, zero MVs are inserted to the end of the list.

In some embodiments, in VVC, when a CU is coded in merge mode, if the CU contains at least 64 luma samples (that is, CU width times CU height is equal to or larger than 64), and if both CU width and CU height are less than 128 luma samples, an additional flag is signaled to indicate if the combined inter/intra prediction (CIIP) mode is applied to the current CU. As its name indicates, the CIIP prediction combines an inter prediction signal with an intra prediction signal. The inter prediction signal in the CIIP mode $P_{inter}$ is derived using the same inter prediction process applied to regular merge mode; and the intra prediction signal $P_{intra}$ is derived following the regular intra prediction process with the planar mode. Then, the intra and inter prediction signals are combined using weighted averaging, where the weight value is calculated depending on the coding modes of the top and left neighbouring blocks (block A1 and B1 as depicted in FIG. 10) as follows:

If the top neighbor is available and intra coded, then set isIntraTop to 1, otherwise set isIntraTop to 0;

If the left neighbor is available and intra coded, then set isIntraLeft to 1, otherwise set isIntraLeft to 0;

If (isIntraLeft+isIntraLeft) is equal to 2, then wt is set to 3;

Otherwise, if (isIntraLeft+isIntraLeft) is equal to 1, then wt is set to 2;

Otherwise, set wt to 1.

The CIIP prediction is formed as follows:

$$P_{CIIP} = ((4-wt)*P_{inter} + wt*P_{intra} + 2) >> 2$$

In some embodiments, in VVC, a new triangle partition mode is introduced for inter prediction. The triangle partition mode is only applied to CUs that are 8×8 or larger and are coded in skip or merge mode. For a CU satisfying these conditions and merge flag is on, a CU-level flag is signaled to indicate whether the triangle partition mode is applied or not.

When this mode is used, a CU is split evenly into two triangle-shaped partitions, using either the diagonal split or the anti-diagonal split. Each triangle partition in the CU is inter-predicted using its own motion; only uni-prediction is allowed for each partition, that is, each partition has one motion vector and one reference index. The uni-prediction motion constraint is applied to ensure that under triangle prediction mode only two motion compensated prediction are needed for the CU, which is the same as the conventional bi-prediction.

If the CU-level flag indicates that the current CU is coded using the triangle partition mode, a flag is signaled to indicate the triangle partition direction (i.e. diagonal or anti-diagonal). Then an index is signaled for each of the two partitions respectively to indicate the merge motion vector candidate that is used for each triangle partition. After predicting each of the triangle partitions, the sample values along the diagonal or anti-diagonal edge are adjusted using a blending processing with adaptive weights. After the prediction process, transform and quantization process will be applied to the whole CU. It is worth mentioning that the motion field of a CU predicted using the triangle partition mode is stored in 4×4 units.

In some embodiments, Intra block copy (IBC) is a tool adopted in the HEVC extension profile on screen content coding (SCC). It is well known that it significantly improves the coding efficiency of screen content video materials. In particular, IBC could efficiently generate the predictor from the reconstructed regions of the current picture. IBC mode is signaled at block level. Block matching (BM) is performed at the encoder to find the optimal block vector (or motion vector) for each CU. Here, a block vector is used to indicate the displacement from the current block to a reference block which is already reconstructed inside the current picture. The luma block vector of an IBC-coded CU is in integer precision. For certain video formats such as 420, the chroma block vector may be derived from the luma block vector through rounding operation, with result in integer precision as well. When combined with AMVR (adaptive motion vector resolution), the IBC mode can switch between 1-pel and 4-pel motion vector precisions. An IBC-coded CU is treated as the third prediction mode in addition to intra or inter prediction modes. The IBC mode is applicable to CUs with both width and height smaller than or equal to 64 luma samples.

At CU level, IBC mode is signaled with a flag and it can be signaled as IBC AMVP mode or IBC skip/merge mode as follows:

IBC skip/merge mode: a merge candidate index is used to indicate which of the block vectors in the list from neighboring candidate IBC coded blocks is used to predict the current block. The merge list consists of up to two spatial candidates (A1 and B1) and up to two HMVP candidates.

For IBC coded CU which is smaller than or equal to 4×4, only HMVP candidates are used to construct the IBC merge candidate list.

In IBC AMVP mode, the block vector difference is coded in the same way as a motion vector difference. The block vector prediction method uses two candidates as predictors and the same construction process as the IBC merge list is used to construct the IBC AMVP candidates list.

In some embodiments, in History-based Motion Vector Prediction (HMVP), a HMVP candidate is defined as the motion information of a previously coded block. A table (termed as history MV table in the rest of this document) with multiple HMVP candidates is maintained during the encoding/decoding process. The table is emptied when a new slice or a first CTU of each CTU row is encountered. Whenever there is a non-subblock inter-coded CU, the associated motion information is added to the last entry of the table as a new HMVP candidate. In VVC the HMVP table size is set to be 6, which indicates up to 6 History-based MVP (HMVP) candidates may be added to the table. When inserting a new motion candidate to the table, a constrained first-in-first-out (FIFO) rule is utilized wherein redundancy check (i.e. MV pruning) is firstly applied to find whether there is an identical HMVP in the table. If found, the identical HMVP is removed from the table and all the HMVP candidates afterwards are moved forward (toward the first entry). It is worth noting that the one stored in the last entry is the newest MVP and the one store in the first entry is the oldest one.

As illustrated in the previous section, HMVP candidates could be used in the merge candidate list construction process after the TMVP candidate. The HMVP candidates in the table are checked in the order from the last entry to the first entry in the HMVP table. Redundancy check is applied on the first two HMVP candidates, with each of the two HMVP candidates compared to a left spatial merge candidate A1 and an above spatial merge candidate B1. In other words, the number of identical MV candidate checking when inserting the HMVP candidates is up to 4. Once the total number of available merge candidates reaches the maximally allowed merge candidates minus 1, the merge candidate list construction process from HMVP is terminated.

HMVP candidates could also be used in the AMVP candidate list construction process. The HMVP candidates in the table are checked in the order from the first entry to the last entry in the HMVP table and inserted to the candidate list after the TMVP candidate. Redundancy check is not applied on the HMVP candidates.

As illustrated in the previous section, HMVP candidates could be used in the IBC merge candidate list construction process and also the IBC AMVP list construction. The HMVP candidates in the table are checked in the order from the last entry to the first entry in the HMVP table and inserted to the candidate list after the TMVP candidate. Redundancy check is applied on the first HMVP candidates and the checked HMVP candidates only need to be compared to left spatial merge candidate and above spatial merge candidate. In other words, the number of identical MV candidate checking when inserting the HMVP candidates is up to 2.

In some embodiments, Motion Estimation Region (MER) for parallel motion estimation is used. To speed up the encoding process, motion estimation can be performed in parallel whereby the motion vectors for all prediction units inside a given region are derived in simultaneously. The derivation of merge candidates from spatial neighborhood may interfere with parallel processing as one prediction unit cannot derive the motion parameters from an adjacent PU until its associated motion estimation is completed. To mitigate the trade-off between coding efficiency and processing latency, HEVC defines the Motion Estimation Region (MER) whose size is signaled in the picture parameter set using the "log2_parallel_merge_level_minus2" syntax element. When a MER is defined, merge candidates falling in the same region are marked as unavailable and therefore not considered in the list construction.

In some embodiments, the way the merge candidate list is constructed introduces dependencies between neighboring blocks. Especially in embedded encoder implementations, the motion estimation stage of neigh-boring blocks is typically performed in parallel or at least pipelined to increase the throughput. For AMVP, this is not a big issue since the MVP is only used to differentially code the MV found by the motion search. The motion estimation stage for the merge mode, however, would typically just consist of the candidate list construction and the decision which candidate to choose, based on a cost function. Due to the aforementioned dependency between neighboring blocks, merge candidate lists of neighboring blocks cannot be generated in parallel and represent a bottleneck for parallel encoder designs. Therefore, several methods which make the merge related modes more parallel friendly are introduced. In the following section, the width and height of the PMER is denoted as W and H, respectively.

SbTMVP for Parallel Motion Estimation Region (PMER)

In the first embodiment of this disclosure, when the location of the neighboring block used to derive the TV of SbTMVP is located within the same PMER as the current block, the derived TV from the spatial block is regarded as not available and the default TV (e.g. zero vector) is used.

In the second embodiment of this disclosure, the derivation of the spatial neighboring block used to derive the temporal vector (TV) for the SbTMVP is modified to derive a block outside a predefined parallel motion estimation region (PMER). Different schemes can be utilized to locate the spatial neighboring block for TV derivation. Several examples are illustrated below. The embodiment is not limited to the illustrated examples. The location of the neighboring block is derived as the block which contains the sample which is located at one of the locations illustrated below. In the illustrated examples, the location of the top-left sample of the current luma coding block relative to the top-left luma sample of the current picture is denoted as (xCb, yCb); the locations (xA0, yA0), (xA1, yA1), (xA2, yA2), (xB0, yB0), (xB1, yB1), (xB2, yB2) are the sample positions which are covered by the neighbouring blocks; the two variables cbWidth and cbHeight specify the width and the height of the luma coding block $$(xA_0, yA_0) = (xCb/W*W-1, yCb+cbHeight) \quad\quad 1)$$

$$(xA_0, yA_0) = (xCb/W*W-1, (yCb+cbHeight)/H*H) \quad\quad 2)$$

$$(xA_1, yA_1) = (xCb/W*W-1, yCb+cbHeight-1) \quad\quad 3)$$

$$(xA_1, yA_1) = (xCb/W*W-1, (yCb+cbHeight)/H*H-1) \quad\quad 4)$$

$$(xA_2, yA_2) = (xCb/W*W-1, yCb) \quad\quad 5)$$

$$(xA_2, yA_2) = (xCb/W*W-1, yCb/H*H) \quad\quad 6)$$

$$(xB_0, yB_0) = (xCb+cbWidth, yCb/H*H-1) \quad\quad 7)$$

$$(xB_0, yB_0) = ((xCb+cbWidth)/W*W, yCb/H*H-1) \quad\quad 8)$$

$$(xB_1, yB_1) = (xCb+cbWidth-1, yCb/H*H-1) \quad\quad 9)$$

$$(xB_1, yB_1) = ((xCb+cbWidth)/W*W-1, yCb/H*H-1) \quad\quad 10)$$

$$(xB_2, yB_2) = (xCb/W*W-1, yCb/H*H-1) \quad\quad 11)$$

$$(xB_2, yB_2) = (xCb/W*W-1, yCb-1) \quad\quad 12)$$

$$(xB_2, yB_2) = (xCb-1, yCb/H*H-1) \quad\quad 13)$$

Figure 11:
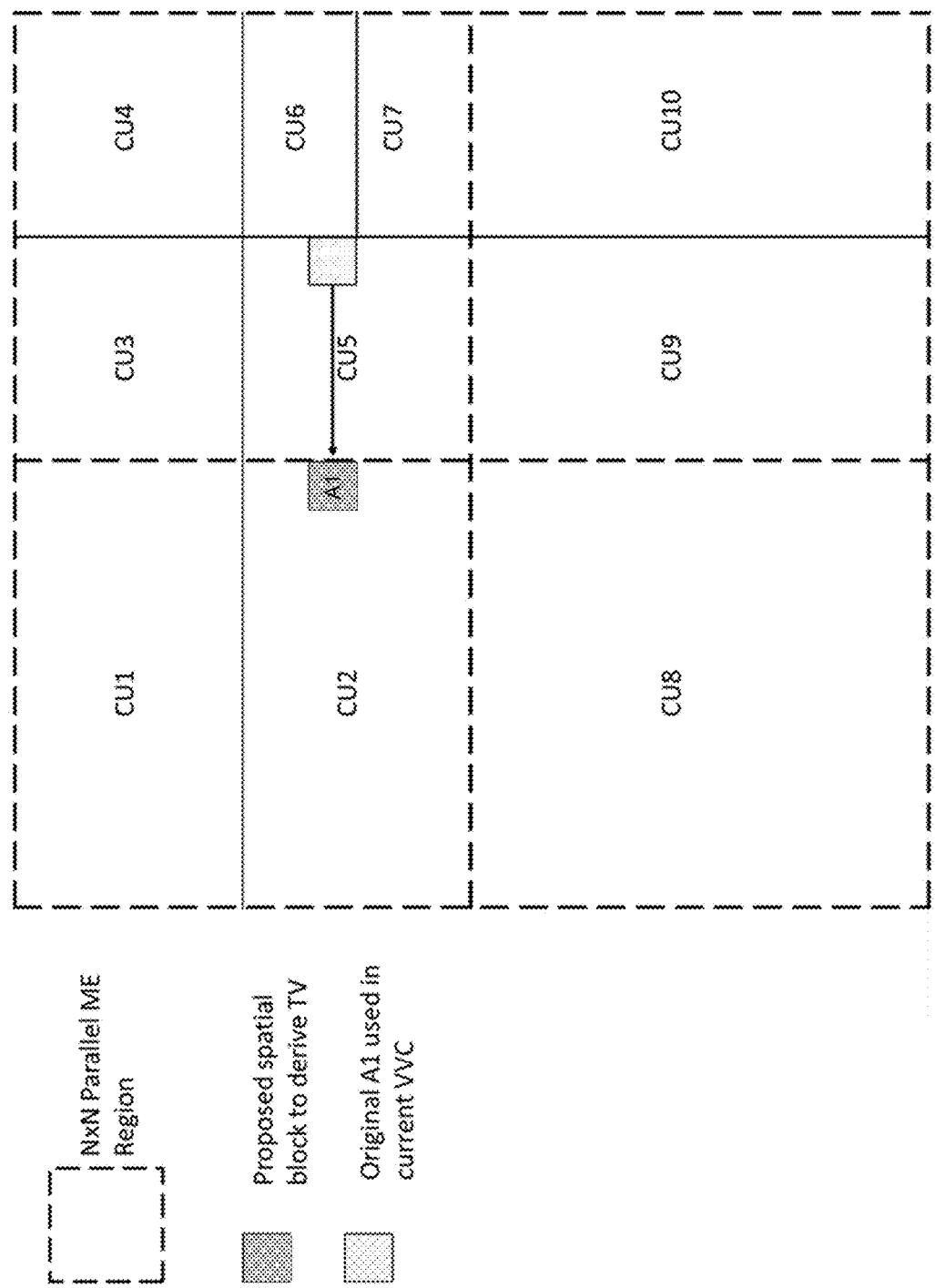
FIG. 11 is a block diagram illustrating the exemplary positions of the spatial neighboring block to derive the temporal vector in accordance with some implementations of the present disclosure.

FIG. 11 is a block diagram illustrating the exemplary positions of the spatial neighboring block to derive the TV in accordance with some implementations of the present disclosure. FIG. 11 shows an example where the neighboring block A1 used to derive the TV of SbTMVP for CU 6 is located outside the MER according to the location derived using the equation 1 above. In the current VVC, the spatial block used to derive TV of SbTMVP for CU6 depends on the reconstruction of CU5. Therefore, this dependency has issues for the parallel motion search.

In the third embodiment of this disclosure, the spatial neighboring block used to derive the temporal vector (TV) for the SbTMVP is modified to the block at the upper boundary of the current block. For some hardware encoder design, the MVs of the neighboring blocks which are located at the upper position of current block (e.g. block B0, B1 and B2 in FIG. 10) are already reconstructed and available. Therefore, deriving the temporal vector form the upper neighboring blocks has less issue for parallel motion estimation compared to using the neighboring blocks to the left of the current block (e.g. block A1). Different schemes can be utilized to locate one spatial neighboring block for TV derivation. Several examples are illustrated below. The embodiment is not limited to the illustrated examples. The location of the neighboring block is derived as the block which contain the sample which is located at one of the locations illustrated below:

$$(xB_0, yB_0) = (xCb+cbWidth, yCb-1) \quad\quad 1)$$

$$(xB_1, yB1) = (xCb+cbWidth-1, yCb-1) \quad\quad 2)$$

$$(xB2, yB2) = (xCb-1, yCb-1) \quad\quad 3)$$

In the fourth embodiment of this disclosure, the HMVP candidate in the first entry of the HMVP table is used to derive the TV for SbTMVP.

In the fifth embodiment of this disclosure, the temporal motion vector derived from the blocks in the collocated picture is used to derive the TV for SbTMVP.

IBC Merge for MER

In the sixth embodiment of this disclosure, when the location of the neighboring block used to derive IBC merge candidates is located within the same PMER as the current block, the derived IBC merge candidates are regarded as not available.

Figure 12:
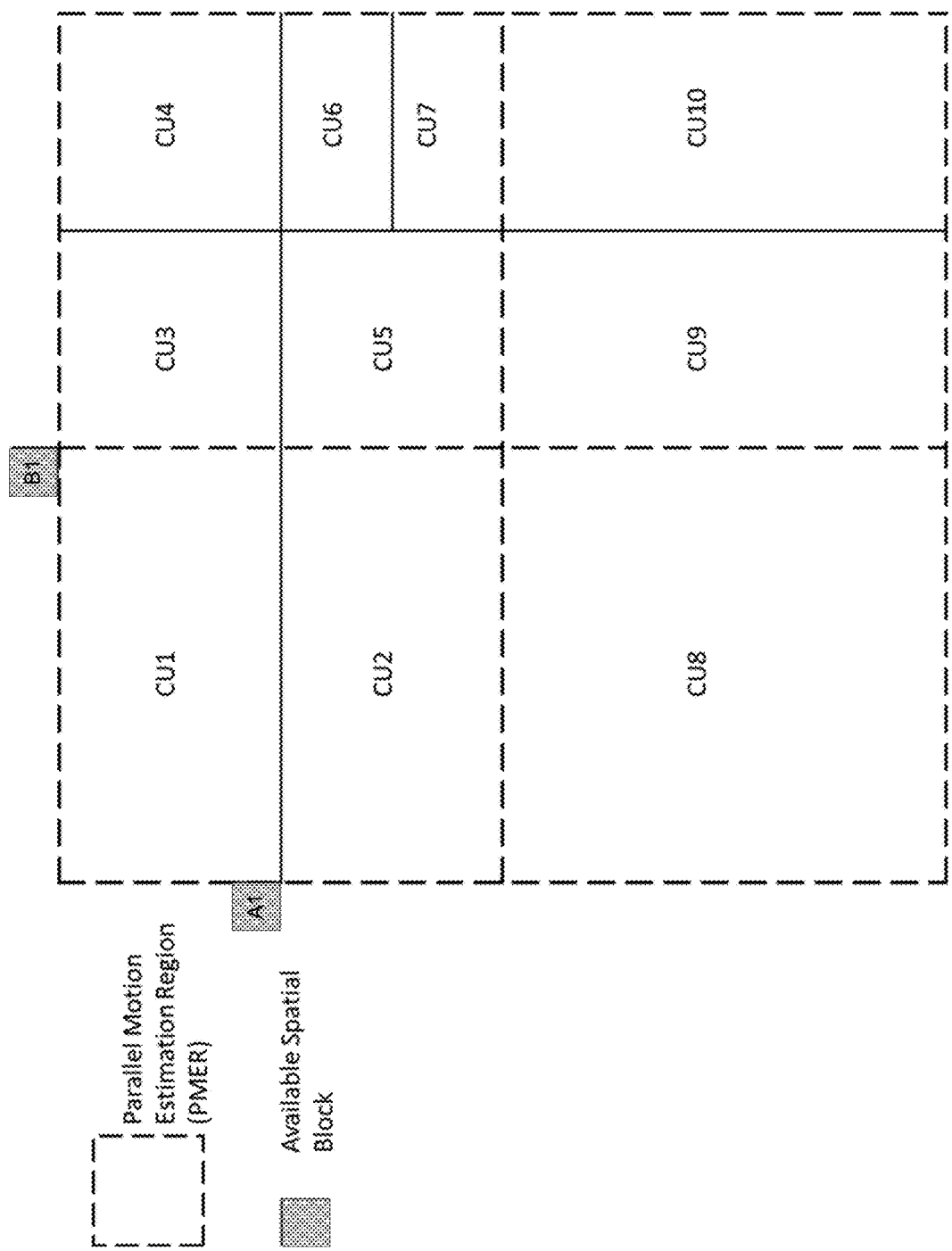
FIG. 12 is a block diagram illustrating the exemplary positions of the IBC spatial candidates in accordance with some implementations of the present disclosure.

FIG. 12 is a block diagram illustrating the exemplary positions of the IBC spatial candidates in accordance with some implementations of the present disclosure. FIG. 12 is an example where the two neighboring blocks (A1, B1) are checked according to a predefined order to derive the IBC merge candidates for the current block (CU1). Since all the neighboring two blocks are located in different PMER, the two neighboring blocks are regarded as available.

Figure 13:
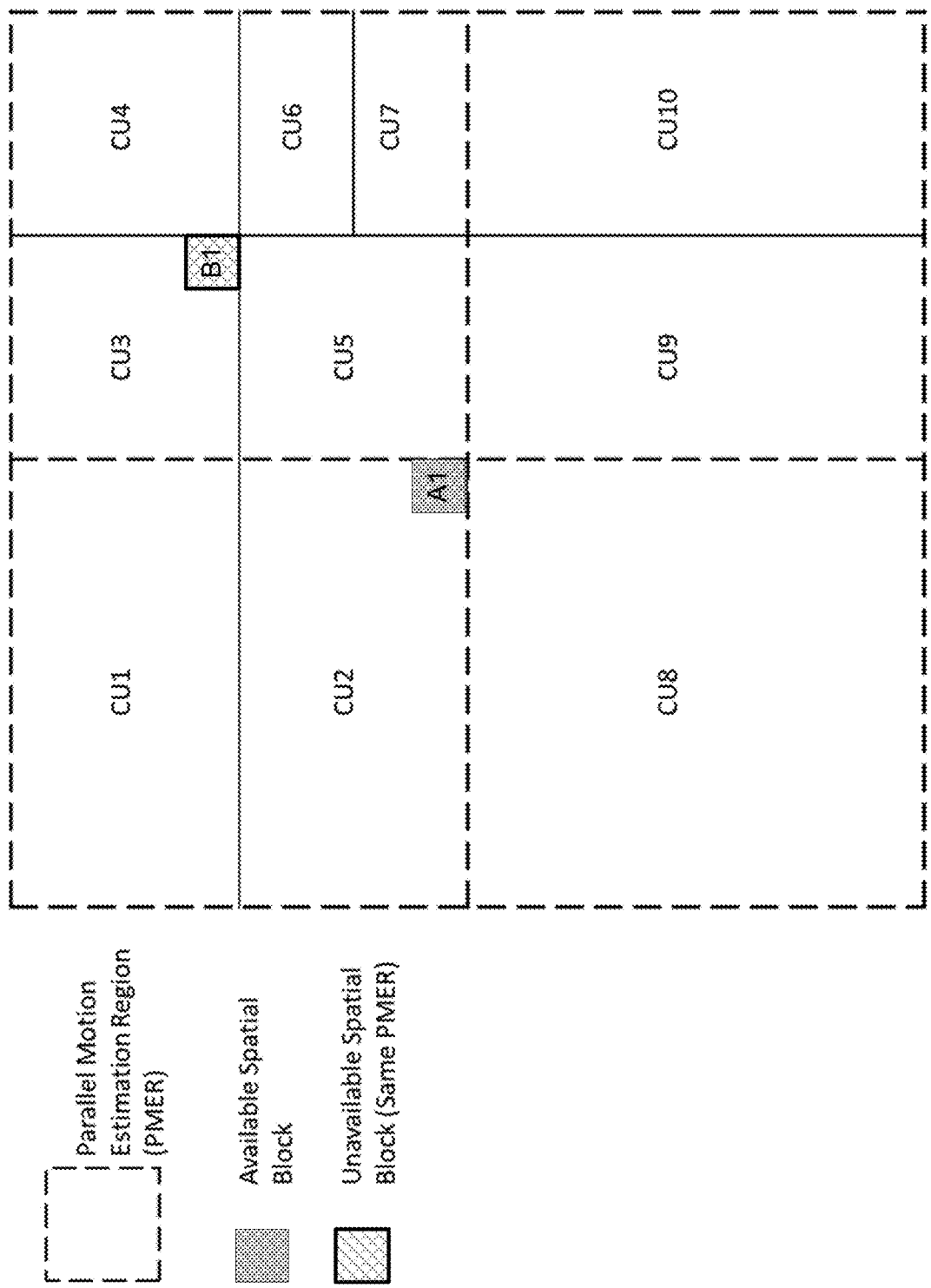
FIG. 13 is a block diagram illustrating the exemplary positions of the IBC spatial candidates in accordance with some implementations of the present disclosure.

FIG. 13 is a block diagram illustrating the exemplary positions of the IBC spatial candidates in accordance with some implementations of the present disclosure. In another example as shown in FIG. 13, the neighboring blocks A1 of CU 5 is located in a different MER and thus it is regarded as available. The neighboring block B1 is located within the same MER and it is regarded as unavailable.

In the seventh embodiment of this disclosure, the derivation of the spatial neighboring block used to derive the IBC merge candidates is modified to derive a block outside a predefined parallel motion estimation region (PMER). The location of the neighboring block is derived as the block which contains the sample which is located at one of the locations illustrated below:

$(xA_0,yA_0)=(xCb/W*W-1,yCb+cbHeight)$     1)

$(xA_0,yA_0)=(xCb/W*W-1,(yCb+cbHeight)/H*H)$     2)

$(xA_1,yA_1)=(xCb/W*W-1,yCb+cbHeight-1)$     3)

$(xA_1,yA_1)=(xCb/W*W-1,(yCb+cbHeight)/H*H-1)$     4)

$(xA_2,yA_2)=(xCb/W*W-1,yCb)$     5)

$(xA_2,yA_2)=(xCb/W*W-1,yCb/H*H)$     6)

$(xB_0,yB_0)=(xCb+cbWidth,yCb/H*H-1)$     7)

$(xB_0,yB_0)=((xCb+cbWidth)/W*W,yCb/H*H-1)$     8)

$(xB_1,yB_1)=(xCb+cbWidth-1,yCb/H*H-1)$     9)

$(xB_1,yB_1)=((xCb+cbWidth)/W*W-1,yCb/H*H-1)$     10)

$(xB_2,yB_2)=(xCb/W*W-1,yCb/H*H-1)$     11)

$(xB_2,yB_2)=(xCb/W*W-1,yCb-1)$     12)

$(xB_2,yB_2)=(xCb-1,yCb/H*H-1)$     13)

Figure 14:
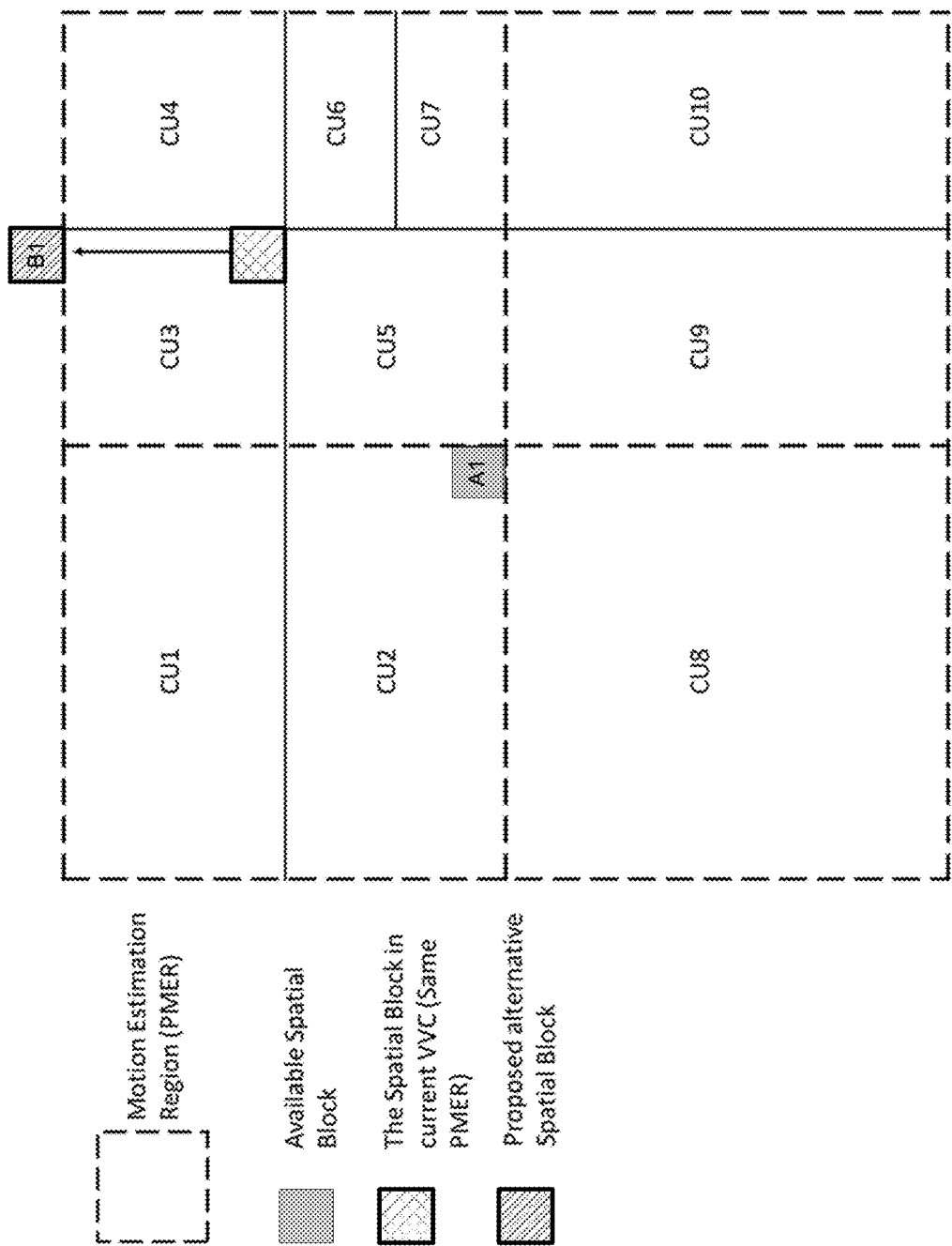
FIG. 14 and FIG. 15 are block diagrams illustrating the exemplary positions of the non-adjacent spatial candidates in accordance with some implementations of the present disclosure.
Figure 15:
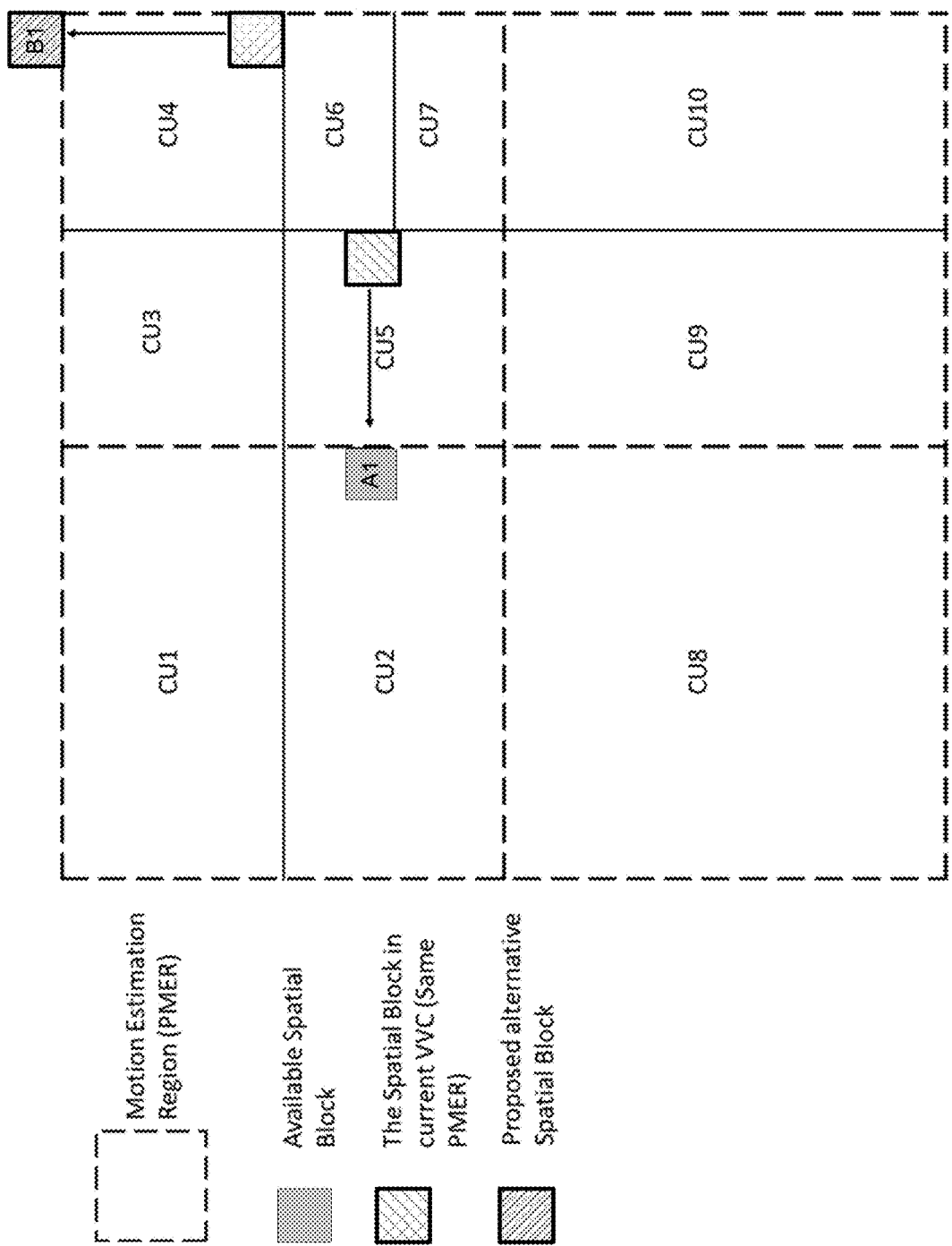

FIG. 14 and FIG. 15 are block diagrams illustrating the exemplary positions of the non-adjacent spatial candidates in accordance with some implementations of the present disclosure. In one example as shown in FIG. 14 and FIG. 15, the spatial neighboring block located immediately adjacent to the above boundary of the PMER region is used to derive the IBC merge candidate. In the examples, location equation 9 above is used.

In FIG. 15, the spatial neighboring block located immediately adjacent to the left boundary of the MER region is used to derive the IBC merge candidate. In the examples, location equation 3 above is used.

In the eighth embodiment of this disclosure, when inserting the HMVP candidates into the IBC merge candidate list, the HMVP candidates in the table are checked in the order from the first entry to the last entry in the HMVP table.

CIIP for Parallel Motion Estimation Region (PMER)

In the ninth embodiment of this disclosure, when the location of the neighboring block used to derive the weighting (e.g., wt) for a CIIP coded block is located within the same PMER as the current block, the neighboring block is regarded as not available.

In the tenth embodiment of this disclosure, the derivation of the spatial neighboring block used to derive the weighting for the CIIP coded block is modified to derive a block outside a predefined parallel motion estimation region (PMER). Different schemes can be utilized to locate the spatial neighboring block for weighting determination. Several examples are illustrated below. The embodiment is not limited to the illustrated examples. The location of the neighboring block is derived as the block which contains the sample which is located at one of the locations illustrated below. In the illustrated examples, the location of the top-left sample of the current luma coding block relative to the top-left luma sample of the current picture is denoted as (xCb, yCb); the locations (xA0, yA0), (xA1, yA1), (xA2, yA2), (xB0, yB0), (xB1, yB1), (xB2, yB2) are the sample positions which are covered by the neighbouring blocks; the two variables cbWidth and cbHeight specify the width and the height of the luma coding block $(xA_0,yA_0)=(xCb/W*W-1,yCb+cbHeight)$     1)

$(xA_0,yA_0)=(xCb/W*W-1,(yCb+cbHeight)/H*H)$     2)

$(xA_1,yA_1)=(xCb/W*W-1,yCb+cbHeight-1)$     3)

$(xA_1,yA_1)=(xCb/W*W-1,(yCb+cbHeight)/H*H-1)$     4)

$(xA_2,yA_2)=(xCb/W*W-1,yCb)$     5)

$(xA_2,yA_2)=(xCb/W*W-1,yCb/H*H)$     6)

$(xB_0,yB_0)=(xCb+cbWidth,yCb/H*H-1)$     7)

$(xB_0,yB_0)=((xCb+cbWidth)/W*W,yCb/H*H-1)$     8)

$(xB_1,yB_1)=(xCb+cbWidth-1,yCb/H*H-1)$     9)

$(xB_1,yB_1)=((xCb+cbWidth)/W*W-1,yCb/H*H-1)$     10)

$(xB_2,yB_2)=(xCb/W*W-1,yCb/H*H-1)$     11)

$(xB_2,yB_2)=(xCb/W*W-1,yCb-1)$     12)

$(xB_2,yB_2)=(xCb-1,yCb/H*H-1)$     13)

Figure 16:
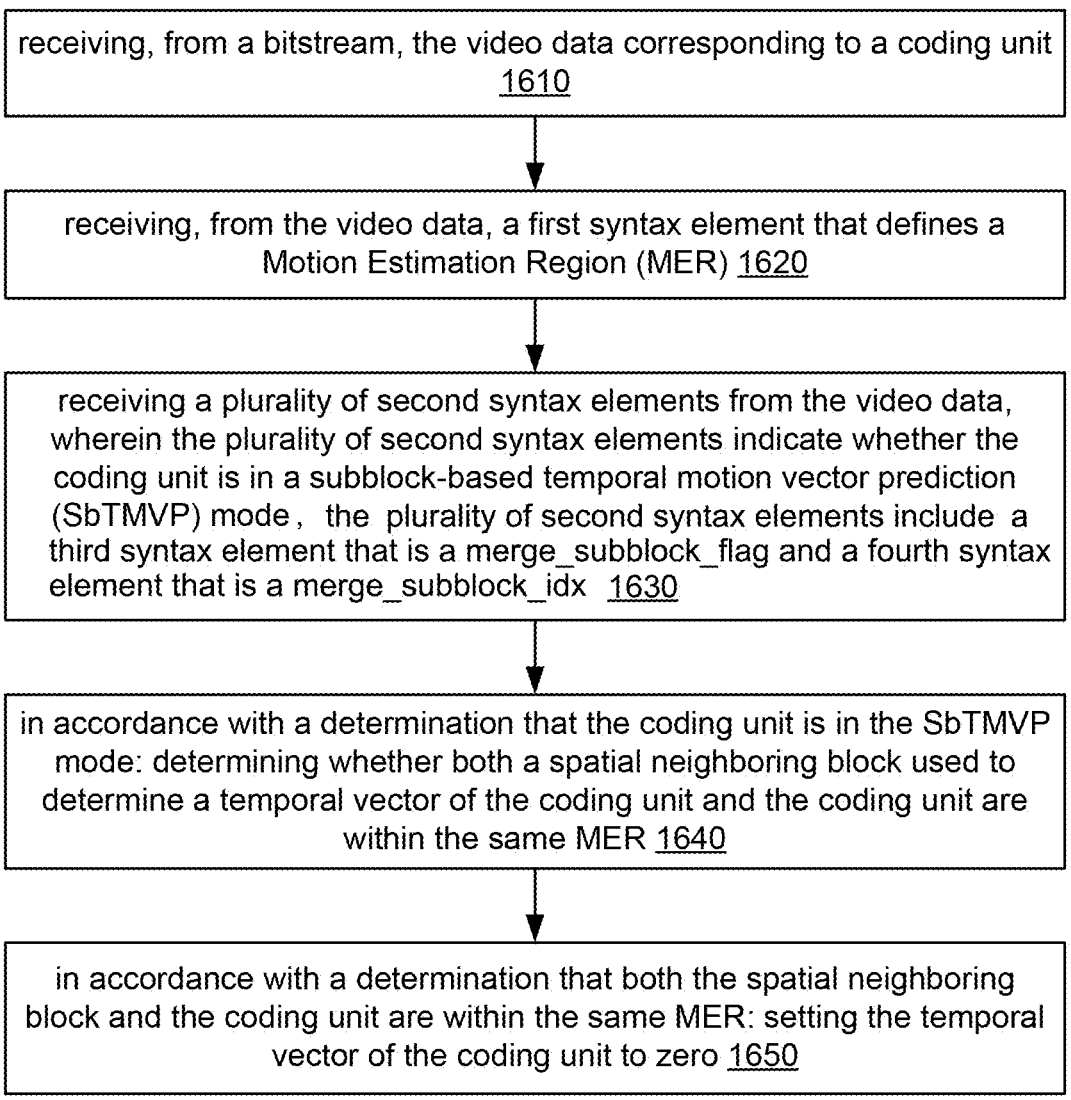
FIG. 16 is a flowchart illustrating an exemplary process of determining the current merge candidate alternative when the current coding unit/block and the spatial neighboring block used to determine a current merge candidate are in the same Motion Estimation Region (MER) in accordance with some implementations of the present disclosure.

FIG. 16 is a flowchart illustrating an exemplary process 1600 by which a video coder implements the techniques of determining the current merge candidate alternative when the current coding unit/block and the spatial neighboring block used to determine a current merge candidate are in the same Motion Estimation Region (MER), in accordance with some implementations of the present disclosure. For convenience of description, the process 1600 is described as being performed by a video decoder, e.g., the video decoder 30 of FIG. 3.

First Embodiment

In some embodiments, the video decoder 30 receives, from a bitstream, the video data corresponding to a coding unit (1610) and then receives, from the video data, a first syntax element that defines a Motion Estimation Region (MER) (1620).

The video decoder 30 receives a plurality of second syntax elements from the video data, the plurality of second syntax elements indicating whether the coding unit is in a subblock-based temporal motion vector prediction (SbTMVP) mode (1630).

In some embodiments, the plurality of second syntax elements includes a third syntax element indicating whether the coding unit is in a sub-block merge mode and a fourth syntax element indicating which subblock-based merge candidate is used to reconstruct the coding unit. The third syntax element is a merge_subblock_flag and the fourth syntax element is a merge_subblock_idx.

In accordance with a determination that the coding unit is in sub-block merge mode, the video decoder 30 receives a plurality of subblock-based merge candidates for the coding unit that are derived from the neighboring blocks. Each subblock merge candidate is constructed by multiple neighboring blocks. The neighboring blocks include spatial and temporal neighboring blocks. In some embodiments, the plurality of subblock-based merge candidates includes both the SbTMVP and the affine merge candidates.

In accordance with a determination that the coding unit is in the SbTMVP mode, the video decoder 30 determines whether both a spatial neighboring block used to determine a temporal vector of the coding unit and the coding unit are within the same MER (1640).

In accordance with a determination that the spatial neighboring block is a SbTMVP candidate, the coding unit is in the SbTMVP mode.

In accordance with a determination that both the spatial neighboring block and the coding unit are within the same MER, the video decoder 30 sets the temporal vector of the coding unit to zero (1650).

Second Embodiment

In some embodiments, the video decoder 30 receives, from a bitstream, the video data corresponding to a coding unit and then receives, from the video data, a first syntax element that defines a Motion Estimation Region (MER). The video decoder 30 receives a plurality of second syntax elements from the video data, wherein the plurality of second syntax elements indicate whether the coding unit is in a subblock-based temporal motion vector prediction (SbTMVP) mode. In accordance with a determination that the coding unit is in the SbTMVP mode, the video decoder 30 determines whether both a first spatial neighboring block used to determine a temporal vector of the coding unit and the coding unit are within the same MER. In accordance with a determination that both the first spatial neighboring block and the coding unit are within the same MER, the video decoder 30 selects a second spatial neighboring block that is outside of the MER as a replacement to the first spatial neighboring block to determine the temporal vector of the coding unit.

In some embodiments, the second spatial neighboring block that is outside of the MER is a spatial neighboring block at a left position of the first spatial neighboring block.

In some embodiments, the second spatial neighboring block that is outside of the MER is a spatial neighboring block at an upper position of the first spatial neighboring block.

In some embodiments, the second spatial neighboring block that is outside of the MER is a spatial neighboring block at an upper left position of the first spatial neighboring block.

Third Embodiment

In some embodiments, the video decoder 30 receives, from a bitstream, the video data corresponding to a coding unit. The video decoder 30 then receives, from the video data, a first syntax element that defines a Motion Estimation Region (MER). The video decoder 30 receives a plurality of second syntax elements from the video data, wherein the plurality of second syntax elements indicate whether the coding unit is in a merge mode. In accordance with a determination that the coding unit is in the merge mode, the video decoder 30 receives a plurality of merge candidates for the coding unit, and determines whether both a first spatial neighboring block used to determine a first merge candidate from the plurality of merge candidates and the coding unit are within the same MER. In accordance with a determination that both the first spatial neighboring block and the coding unit are within the same MER, the video decoder 30 selects a second merge candidate from the plurality of merge candidates as a replacement to the first merge candidate.

In some embodiments, the merge mode is Intra block copy (IBC) Merge.

In some embodiments, the merge mode is Combined inter and intra prediction (CIIP) Merge.

Fourth Embodiment

In some embodiments, the video decoder 30 receives, from a bitstream, the video data corresponding to a coding unit. The video decoder 30 then receives, from the video data, a first syntax element that defines a Motion Estimation Region (MER). The video decoder 30 receives a plurality of second syntax elements from the video data, wherein the plurality of second syntax elements indicate whether the coding unit is in a merge mode. In accordance with a determination that the coding unit is in the merge mode, the video decoder 30 determines whether both a first spatial neighboring block used to determine a merge candidate and the coding unit are within the same MER. In accordance with a determination that both the first spatial neighboring block and the coding unit are within the same MER, the video decoder 30 selects a second spatial neighboring block that is outside of the MER as a replacement to the first spatial neighboring block as the merge candidate.

In some embodiments, the second spatial neighboring block that is outside of the MER is a spatial neighboring block at one of merge candidate positions for a coding block of a neighboring MER.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the implementations described in the present application. A computer program product may include a computer-readable medium.

The terminology used in the description of the implementations herein is for the purpose of describing particular implementations only and is not intended to limit the scope of claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, elements, and/or components, but do not preclude the presence or addition of one or more other features, elements, components, and/or groups thereof.

It will also be understood that, although the terms first, second, etc. may be used herein to describe various elements, these elements should not be limited by these terms. These terms are only used to distinguish one element from another. For example, a first electrode could be termed a second electrode, and, similarly, a second electrode could be termed a first electrode, without departing from the scope of the implementations. The first electrode and the second electrode are both electrodes, but they are not the same electrode.

Reference throughout this specification to "one example," "an example," "exemplary example," or the like in the singular or plural means that one or more particular features, structures, or characteristics described in connection with an example is included in at least one example of the present disclosure. Thus, the appearances of the phrases "in one example" or "in an example," "in an exemplary example," or the like in the singular or plural in various places throughout this specification are not necessarily all referring to the same example. Furthermore, the particular features, structures, or characteristics in one or more examples may include combined in any suitable manner.

The description of the present application has been presented for purposes of illustration and description, and is not intended to be exhaustive or limited to the invention in the form disclosed. Many modifications, variations, and alternative implementations will be apparent to those of ordinary skill in the art having the benefit of the teachings presented in the foregoing descriptions and the associated drawings. The embodiment was chosen and described in order to best explain the principles of the invention, the practical application, and to enable others skilled in the art to understand the invention for various implementations and to best utilize the underlying principles and various implementations with various modifications as are suited to the particular use contemplated. Therefore, it is to be understood that the scope of claims is not to be limited to the specific examples of the implementations disclosed and that modifications and other implementations are intended to be included within the scope of the appended claims.

What is claimed is:

1. A method of decoding video data, comprising:
   receiving, from a bitstream, a first syntax element that is used to define a Motion Estimation Region (MER), wherein construction of a merge candidate list of a coding unit in the MER is independent of other coding units in the MER;
   receiving a plurality of second syntax elements from the bitstream, wherein at least one of the plurality of second syntax elements indicates whether a subblock-based temporal motion vector prediction (SbTMVP) mode is enabled for the coding unit; and
   in accordance with a determination that the coding unit is in a sub-block merge mode and the SbTMVP mode is enabled for the coding unit:
      determining whether both a first spatial neighboring block used to determine a temporal vector of the coding unit and the coding unit are within the same MER,
   wherein in accordance with the determination that both the first spatial neighboring block and the coding unit are within the same MER, the temporal vector of the coding unit is equal to zero,
   wherein the plurality of second syntax elements includes a third syntax element indicating whether the coding unit is in the sub-block merge mode,
   wherein the method further comprises: receiving a fourth syntax element indicating which subblock-based merge candidate is used to reconstruct the coding unit in a case that the coding unit is in the sub-block merge mode, and
   wherein the third syntax element is a merge_subblock_flag and the fourth syntax element is a merge_subblock_idx.

2. The method of decoding video data according to claim 1, further comprising:
   in accordance with a determination that the coding unit is in the sub-block merge mode, deriving a plurality of subblock-based merge candidates for the coding unit that are derived from neighboring blocks.

3. The method of decoding video data according to claim 2, wherein the plurality of subblock-based merge candidates includes both SbTMVP and affine merge candidates.

4. The method of decoding video data according to claim 3, wherein in accordance with a determination that a selected merge candidate is a SbTMVP candidate, the coding unit is in the SbTMVP mode.

5. An electronic apparatus comprising:
   one or more processing units;
   memory coupled to the one or more processing units; and
   a plurality of programs stored in the memory that, when executed by the one or more processing units, cause the electronic apparatus to:
   receive, from a bitstream, a first syntax element that is used to define a Motion Estimation Region (MER), wherein construction of a merge candidate list of a coding unit in the MER is independent of other coding units in the MER;
   receive a plurality of second syntax elements from the bitstream, wherein at least one of the plurality of second syntax elements indicates whether a subblock-based temporal motion vector prediction (SbTMVP) mode is enabled for the coding unit; and
   in accordance with a determination that the coding unit is in a sub-block merge mode and the SbTMVP mode is enabled for the coding unit:
      determine whether both a first spatial neighboring block used to determine a temporal vector of the coding unit and the coding unit are within the same MER,
   wherein in accordance with the determination that both the first spatial neighboring block and the coding unit are within the same MER, the temporal vector of the coding unit is equal to zero,
   wherein the plurality of second syntax elements includes a third syntax element indicating whether the coding unit is in the sub-block merge mode,
   wherein the plurality of programs stored in the memory that, when executed by the one or more processing units, cause the electronic apparatus to: receive a fourth syntax element indicating which subblock-based merge candidate is used to reconstruct the coding unit in a case that the coding unit is in the sub-block merge mode, and
   wherein the third syntax element is a merge_subblock_flag and the fourth syntax element is a merge_subblock_idx.

6. The electronic apparatus according to claim 5, wherein the plurality of programs, when executed by the one or more processing units, further cause the electronic apparatus to:
   in accordance with a determination that the coding unit is in the sub-block merge mode, derive a plurality of subblock-based merge candidates for the coding unit that are derived from neighboring blocks.

7. The electronic apparatus according to claim 6, wherein the plurality of subblock-based merge candidates includes both SbTMVP and affine merge candidates.

8. The electronic apparatus according to claim 7, wherein in accordance with a determination that a selected merge candidate is a SbTMVP candidate, the coding unit is in the SbTMVP mode.

9. A non-transitory computer readable storage medium storing a bitstream to be decoded by a method comprising:
   receiving, from a bitstream, a first syntax element that is used to define a Motion Estimation Region (MER), wherein construction of a merge candidate list of a coding unit in the MER is independent of other coding units in the MER;

receiving a plurality of second syntax elements from the bitstream, wherein at least one of the plurality of second syntax elements indicates whether a subblock-based temporal motion vector prediction (SbTMVP) mode is enabled for the coding unit; and in accordance with a determination that the coding unit is in a sub-block merge mode and the SbTMVP mode is enabled for the coding unit:

determining whether both a first spatial neighboring block used to determine a temporal vector of the coding unit and the coding unit are within the same MER, wherein in accordance with the determination that both the first spatial neighboring block and the coding unit are within the same MER, the temporal vector of the coding unit is equal to zero, wherein the plurality of second syntax elements includes a third syntax element indicating whether the coding unit is in the sub-block merge mode, wherein the method further comprises: receiving a fourth syntax element indicating which subblock-based merge candidate is used to reconstruct the coding unit in a case that the coding unit is in the sub-block merge mode, and wherein the third syntax element is a merge_subblock_flag and the fourth syntax element is a merge_subblock_idx.

10. The non-transitory computer readable storage medium according to claim 9, wherein the method further comprises:

in accordance with a determination that the coding unit is in the sub-block merge mode, deriving a plurality of subblock-based merge candidates for the coding unit that are derived from neighboring blocks.

11. The non-transitory computer readable storage medium according to claim 10, wherein the plurality of subblock-based merge candidates includes both SbTMVP and affine merge candidates.

12. The non-transitory computer readable storage medium according to claim 11, wherein in accordance with a determination that a selected merge candidate is a SbTMVP candidate, the coding unit is in the SbTMVP mode.

* * * * *